United States Patent [19]

Fujiwara et al.

[11] Patent Number: 5,103,356
[45] Date of Patent: Apr. 7, 1992

[54] MAGNETIC TAPE RECORDING AND PLAYBACK DEVICE INTERCONNECTED BY CONDUCTOR PATTERNS FORMED ON A CIRCUIT BOARD

[75] Inventors: Osamu Fujiwara; Kunihiko Nakagawa; Yoshinori Kakuta; Masami Tomita; Seiji Kishikawa; Tooru Yuri, all of Nagaokakyo, Japan

[73] Assignee: Mitsubishi Danki Kabuhiki Kaisha, Tokyo, Japan

[21] Appl. No.: 323,843

[22] Filed: Mar. 15, 1989

[30] Foreign Application Priority Data

| Mar. 15, 1988 | [JP] | Japan | 63-62126 |
| Jul. 28, 1988 | [JP] | Japan | 63-100345[U] |
| Jul. 29, 1988 | [JP] | Japan | 63-191374 |
| Aug. 31, 1988 | [JP] | Japan | 63-115404[U] |
| Sep. 17, 1988 | [JP] | Japan | 63-232918 |
| Oct. 6, 1988 | [JP] | Japan | 63-252322 |

[51] Int. Cl.⁵ ......... G11B 5/08; G11B 15/00
[52] U.S. Cl. ......... 360/85; 360/95; 360/96.3; 360/96.5
[58] Field of Search ......... 360/85, 95, 96.3, 96.5

[56] References Cited

U.S. PATENT DOCUMENTS

| 4,562,496 | 12/1985 | Saito et al. | 360/85 X |
| 4,566,047 | 1/1986 | Hirose et al. | 360/95 |
| 4,745,498 | 5/1988 | Maeda et al. | 360/85 X |

FOREIGN PATENT DOCUMENTS

| 59-113567 | 6/1984 | Japan | 360/85 |
| 60-166849 | 11/1985 | Japan . | |
| 61-8755 | 1/1986 | Japan . | |
| 61-34633 | 3/1986 | Japan . | |
| 61-105938 | 7/1986 | Japan . | |
| 61-187151 | 8/1986 | Japan . | |
| 62-36772 | 2/1987 | Japan . | |

Primary Examiner—Aristotelis Psitos
Assistant Examiner—Alfonso Garcia

[57] ABSTRACT

In a magnetic tape recording and playback device which has a rotating drum with magnetic heads, a capstan, and reel blocks, the stator coils of motors for driving them are mounted on a board together with electrical circuits for controlling the motors. The electrical circuits and the stator coils of motors are interconnected by conductor patterns formed on the board.

5 Claims, 31 Drawing Sheets

MAGNETIC TAPE RECORDING AND PLAYBACK DEVICE INTERCONNECTED BY CONDUCTOR PATTERNS FORMED ON A CIRCUIT BOARD

BACKGROUND OF THE INVENTION

The invention concerns a magnetic tape recording and playback device with a magnetic tape loading mechanism, in particular, a helical scan system as used in a video tape recorder and digital audio tape recorder.

In a conventional magnetic tape recording and playback device with a helical scan system, a rotating drum equipped with a magnetic head device that has rotating magnetic heads is for example installed on a mechanical chassis in a state coaxial with a fixed drum. A magnetic tape is made to run along the peripheries of these drums so that when the heads rotate at high speed, recording tracks are formed at an inclined angle on the tape. In this way, signals may be recorded or played back.

In such a magnetic tape recording and playback device, there is provided a loading mechanism which takes out the tape from a tape cassette, and winds it around the drums automatically. This loading mechanism comprises a loading block with tape guides, such as a return guide and an inclined guide which engage with and guide the magnetic tape.

The loading block may be driven by a rotating member such as a loading ring which rotates so as to bring the tape from the cassette to a specific loading position near the drums. The rotating member is driven by a motor and the position of loading block is detected by a switch.

This magnetic tape recording and playback device also has a pinch roller pressure mechanism which presses a pinch roller on a capstan. The pressure mechanism may comprises a pinch arm which is for example free to pivot on its one end, the other end thereof being fitted with the pinch roller, and the pinch roller being pressed to the capstan by the action of a solenoid or of a control motor and cam.

In this device, when the pinch roller is pressed against the capstan (i.e. when the pinch roller is ON), the magnetic tape runs at a constant rate, and when the pinch roller is released from the capstan (i.e. when the pinch roller is OFF), the magnetic tape can be moved in fast forward or rewind mode etc.

FIG. 3 shows a conventional example of magnetic tape recording and playback device disclosed in Patent Application Laid-Open No. 8755/1986. A mechanical chassis 1 is provided together with a rotating drum 2 and a pair of tape guides 3 which take out a magnetic tape and allow it to run smoothly. A loading mechanism drive motor 4 is provided together with pinch roller 5 and a pinch arm 6. A capstan 7 together with a pair of reel blocks 8 and a motor 9 which drives capstan 7 and reel blocks 8, and runs the tape are also provided. A deck mechanism 40 comprises all the above parts. An electric circuit 10 which drives and contrtols deck mechanism 40, and lead wires 11 provide an interface between deck mechanism 40 and electrical circuit 10.

In the conventional magnetic tape recording and playback device described above, deck mechanism 40 and electrical circuit 10 are separated, and lead wires 11 are therefore necessary to interconnect them. As there are from several tens to a hundred or so of these lead wires, a great deal of bothersome soldering and connections have to be carried out. The lead wires sometimes break and assembly work is therefore very slow. Furthermore, the fact that the deck mechanism and electrical circuit are separate from each other means that it is difficult to manipulate the device especially in manufacturing or repairing.

FIG. 7 is a perspective view of another conventional magnetic tape recording and playback device disclosed in Utility Model Application Laid-Open No. 34633/1986. A chasis 101 is provided together with a capstan 102 and pinch roller 103. A drive shaft 104, and a circular cam 105 are also provided. A lever 107 rotates on pivot 106, and a lever 109 rotates on pivot 108. A pinch arm rotates on pivot 108, and a spring 111 pulls lever 109 and pinch arm 110. A cam groove 112 is formed on circular cam 105, and a pin 113 is mounted on one end of lever 107 and moves in cam groove 112. A pin 114 mounted on the other end of lever 107. A slit 115 is formed on lever 109 and engagfes with pin 114, and a stopper 116 determines the positions of levers 109 and 110.

The operation of this device will be explained below. Cam 105 is rotated via a worm or other means by any drive mechanism, e.g. a motor not shown. Pin 113 moves along the side walls of cam groove 112, and lever 107 rotates on pivot 106. The rotation direction of lever 107 depends on the rotation direction of cam 105 and the shape of cam groove 112. Assuming that lever 107 rotates on pivot 106 in a clockwise direction, pin 114 then moves in slit 115 while maintaining contact with the side walls of the slit, which causes lever 109 to rotate in the anticlockwise direction under the action of moment on pivot 108. Spring 111 is then extended, pinch arm 110 is rotated in the anticlockwise direction on pivot 108, and pinch roller 103 which is attached on pinch arm 110 also rotates. When the angle of rotation reaches a specific value, pinch roller 103 comes into contact with capstan 102, and the extending force by spring 11 because of further rotation of lever 109 maintains pinch roller 103 in contact with capstan 102.

In the conventional magnetic tape recording and playback device described above, circular cam 105 is used. From a view of strength, the cam has to be made thick, and this makes it difficult to make the device thin. Also, the components of the device are arranged around circular cam 105, which leads to less freedom of design.

FIGS. 13 to 15 are diagrams showing the third conventional magnetic tape recording and playback device disclosed, for example, in Patent Application Laid-Open NO. 187151/1986. FIG. 13 is a plan view of an essential structure showing mainly parts fixed to an upper side of chassis, FIG. 14 is a plan view showing mainly parts fixed to a lower side of the chassis, and FIG. 15 is a longitudinal section in part of the device.

a chassis 201 is provided together with a reel wheel 202 fixed to chassis 201. A capstan supported 203a is supported rotatably on chassis 201, and a flywheel 203b is fixed to capstan 203a. A tape cassette 204 engages with reel wheels 202 and is located in a specific position on chassis 201. A magnetic tape 205 is wound in tape cassette 204, and a rotating drum 206 has magnetic heads and is mounted rotatably on chassis 201. Guide grooves 207 and 208 are formed on chassis 201. Tape loading blocks 209 and 210 respectively through guide grooves 207 and 208. A tension pin 211 is fixed to tension arm 212a which is supported rotatably on chassis 201. An extension spring 212b includes ends which are attached respectively to tension arm 212a and chassis 201. A pinch roller 213 is fitted rotatably on pinch arm 214a. Tape guides 215, 216 and 217 are installed on chassis 201.

Gears 218 and 219 are supported underneath chassis 201 for rotation. Arms 220 and 221 are fixed respectively to gears 218 and 219. Links 222 and 223 include one end of each being attached to arms 220 and 221 respectively such that they can rotate freely, and the other end thereof being attached to tape loading blocks 209 and 210 respectively such that they can rotate freely. A slider 24 slidably mounted underneath chassis 201. Slits 225 and 226 are formed on slider 224. Pins 227 and 228 are mounted on chassis 201 so that they pass through slits 225 and 226 respectively. A pressure member 229A engages with gears 218 and 219, and which like slider 224 has slits through which pins 227 and 228 pass. An extension 229B is spring attached to slider 224 and pressure member 229A. Racks 229a and 229b are formed on pressure member 229A. A guide groove 230 is formed on slider 224.

A circular cam 231 is supported rotatably underneath chassis 201. A cam groove 232 is formed on the bottom of cam 231, and a pin 233 is attached on arm 234 and engages with cam groove 232. Arm 234 is supported rotatably underneath chassis 201. A pin 235 is attached on arm 234, and 236 is a drive gear which is installed underneath chassis 201 and engages with cam 231.

Cam grooves 237 and 238 formed on the upper surface of circular cam 231. Pins 239 and 240 engage with cam grooves 237 and 238 respectively. Arms 241 and 242 include pins 239 and 240 which are attached respectively thereto. A spring 243 includes one end attached to pin 239; the other end, to pinch arm 214a.

An upper slider 244 is slidably mounted on the upper surface of chassis 201. A guide groove 245 is formed on upper slider 244. A pin 246 is fixed on arm 242 and engages with guide groove 245. A slit 247 is formed on upper slider 244. A 248 is fixed on chassis 201 and passes through slit 247. A slit 249 is formed on chassis 201. A pin 250 is attached on upper slider 244 and passes through slit 249. A pressure portion 251 formed on upper slider 244, and a hook 252 is formed on tension arm 212a.

The operation of this device will be explained below. In FIGS. 13 and 14, the elements shown by two-dot chain lines are in the 1st position where magnetic tape 205 has not been taken out from tape cassette 204, i.e. in the position of unloading. The elements shown by solid lines are in the 2nd position where magnetic tape 205 has been taken out from tape cassette 204 and brought into contact with rotating drum 206, i.e. in the position of loading.

In FIG. 14, the loading begins by starting a loading motor not shown. The motor torque is transmitted to drive gear 236, and cam 231 is rotated in the direction shown by arrow 299. Following this motion, arm 234 rotates in the direction shown by arrow 298, and lower slider 224 slides in the direction shown by arrow 297.

Since racks 229a, 229b formed on pressure member 229A engage with gears 218, 219 arms 220 and 221 rotate in the directions shown by arrows 296 and 295 respectively, and tape loading blocks 209 and 210 take out magnetic tape 205 from cassette 204 so as to bring it into the 2nd position where it is in contact with rotating drum 206. At this time tape loading blocks 209 and 210 move through guide grooves 207 and 208 respectively until they reach the loading position.

Simultaneously, the parts located on the upper surface of chassis 201 move as shown in FIG. 13. When cam 231 rotates in the direction of arrow 299, pin 240 slides along cam groove 238, arm 242 rotates in the direction of arrow 294, and upper slider 244 moves in the direction of arrow 293. At this time tension arm 212a, of which the rotation had been prevented by the contact of pressure portion 251 with hook 252, rotates until the tension in magnetic tape 205 balances that in extension spring 212b.

At the same time, pinch arm 214a rotates in the clockwise direction while maintaining contact with tape guide 217 which rotates under the driving force of another drive gear not shown in the figure. Pin 239 slides along cam groove 237, arm 241 rotates in the direction of arrow 292, and pinch roller 213 mounted on pinch arm 214a is pressed on capstan 203a in opposition to the force of compression spring 243.

When magnetic tape 205 is released from rotating drum 206, the loading motor not shown in the figure rotates in the reverse direction, and cam 231 rotates in the direction opposite to arrow 299. Following this motion, the levers, arms and sliders rotate or move in the directions opposite to the arrows and return to their original positions of unloading shown by the two-dot chain line, i.e. to the 1st position in which the magnetic tape is not taken out.

In the conventional magnetic tape recording and playback device of above construction, many cam grooves 232, 237 and 238 are formed on circular cam 231 which is needed to be installed in a limited space. As a result, the grooves have to be formed on both sides of the cam, and the cam must have a considerable thickness. Moreover, the moving amounts of pins 233, 239 and 240 which engage with the grooves of cam 231 are limited less than the radius of the cam. In order to drive the parts which have a great amount of movement, therefore, it is necessary to interpose other members between the parts and the cam. This means that the arrangement of parts is complex, and the device can not be made compact.

FIGS. 20 to 22 are drawings of the fourth conventional magnetic tape recording and playback device disclosed in Utility Model Application Laid-Open No. 166849/2985. FIG. 20 is a plan view of the device in a state of unloading, FIG. 21 is a plan view of the device in the half-loading position, and FIG. 22 is a plan view of the device in a state of loading. A chassis 301 is provided together with a rotating drum 302 installed at a specific inclined angle on chassis 301. A tape cassette 303 is positioned on chassis 301. Magnetic tape 306 is taken out from supply reel 304, and after being wound at a specific angle on rotating drum 302, is taken up by take-up reel 305. A capstan 307 is provided together with 308 and a guide groove 309 formed on chassis 301 for guiding pinch roller 308. A fixed head 310 is installed on chassis 301. A loading cam 314 driven by loading motor 311 via reducing gears 312 and 313. A cam lever 315 and a pin 316 are fixed on chassis 301. One end of cam lever 315 is supported rotatably by pin 316. A pin 317 is installed in the center portion of cam lever 315, and engages with a guide groove (not shown in the figure) formed on loading cam 314. A pin 318 is mounted at another end of cam lever 315. A spring 319 includes one end which is attached to pin 318; another end, to a connecting bar 320. A guide groove 302 is formed at one end of connecting bar 320, and engages pin 318. A pin 321 is attached at another end of connecting bar 320. A pinch arm 322 rotates on pin 323 fixed on chassis 301 and on which pin 321 is rotatably mounted.

A guide post 314 is mounted on pinch arm 322 together with pinch roller 308. A pin 325 is attached at one end of connecting bar 326 and engages with pinch arm 322 such that it can rotate. A pin 327 is fitted at another end of connecting bar 326. A tape guide arm 328 rotates on a pin 329 fixed on chassis 301 and on which pin 327 is rotatably mounted. A tape guide post 328a is mounted on said tape guide arm 328.

Tape loading blocks 303 and 331 engage with ring gear 332 so as to wind magnetic tape 306 on rotating drum 302.

The operation of this device will be described below. First the loading operation in FIG. 20 is discussed. Loading motor 311 rotates in the clockwise direction, and this rotates loading cam 315 in the counterclockwise direction via reducing gears 312 and 313. Pin 317 attached on cam lever 315 slides along the side walls of the guide groove formed on said loading cam 314, so cam lever 315 pivots on pin 316 in the counterclockwise direction. Pin 318 fitted on cam lever 315 then moves connecting bar 320 via spring 319 in the direction of arrow A in the figure. Since connecting bar 320 is engaged with pinch arm 322 via pin 321, pinch arm 322 pivots on pin 323 in the clockwise direction. This causes both pinch roller 308 and guide post 324 mounted on pinch arm 322 to move in the loading direction.

As a result of the rotation of pinch arm 322, connection bar 326 moves via pin 325 in the direction of arrow B in the figure. As connecting bar 326 is engaged with tape guide arm 328 via pin 327, tape guide arm 328 is made to rotate on pin 329, and tape guide post 328a mounted on tape guide arm 328 is thereby loaded to a specific position. These operations bring the device to the half-loading position shown in FIG. 21.

In FIG. 22, ring gear 332 receives a driving force from a drive transmission mechanism (not shown in the figure) via a gear area on its outer circumference, and rotates in the clockwise direction. Tape loading blocks 330 and 331 which are engaged with ring gear 332 and situated inside of tape cassette 303 up to the half-loading position, then take out magnetic tape 306 and wind it on rotating drum 302 at a specific angle so as to reach the loading position shown in FIG. 22.

In the above conventional magnetic tape recording and playback device, tape guide arm 328 is located far from loading cam 314 which drives it, and the drive transmission mechanism from the cam to the arm therefore needs many components such as levers. As a result, it is difficult to ensure the precision of components or dimensional precision among many components, and the structure also takes up too much space.

FIG. 27 is a plan view of the fifth conventional magnetic tape recording and playback device in a state of tape-loading disclosed in Patent Application Laid-Open No. 36772/1987. A chassis 401 is provided together with a rotating drum 402 which is attached on chassis 401 and has magnetic heads. A magnetic tape 403 which is wound and moved around rotating drum 402. A tape cassette 404 is also provided in which tape 403 is stored by being wound around supply reel 405 and take-up reel 406. Tape loading blocks 407 and 408 have guide posts 409 to 412 for moving magnetic tape 403 smoothly, take out tape 403 from cassette 404 and wind it around rotating drum 402. Stoppers 413 and 414 are fixed on chassis 401 for stopping tape loading blocks 407 and 408 at specific positions after they load magnetic tape 403 around rotating drum 402. Guide grooves 415 and 416 are formed on chassis 401 for guiding movement of tape loading blocks 407 and 408. A capstan 417 is located at a take-up side of rotating drum 402 and a pinch roller 418 is provided for pressing magnetic tape 403 on capstan 417. A control head 419 and an erase head 420 each come into contact with loaded magnetic tape 403.

In the device described above, magnetic tape 403 is taken out from tape cassette 404 and wound around rotating drum 402 by guide posts 409 to 412 attached on tape loading blocks 407 and 408. After that, magnetic tape 403 is run by pinch roller 418 and capstan 417 rotating in a specific rate and the information is recorded to and played back from the magnetic tape running in a specific rate. At the time of unloading, tape loading blocks 407 and 408 move back along guide grooves 415 and 416 and magnetic tape 403 is stored in tape cassette 404.

Next the tape loading mechanism with tape loading blocks 407 and 408 will be described below.

FIG. 28 is a bottom view of the tape loading mechanism picked up from FIG. 27, and FIG. 29 is a cross section along the line 29—29 in FIG. 28. A gear 421 is provided to which a force generated from a driving source (not shown) for tape loading is transmitted. A cam gear 422 is provided on which a cam groove 423 is formed almost all around and which rotates in the left and right directions from one end of cam groove 423 to another. A rotating plate 424 is provided which rotates on pivot 425 and on which pin 426 engaging with cam groove 423 is fixed. Pin 426 moves along cam groove 423 in the radial direction of cam gear 422 in accordance with the rotation of the cam gear. Therefore rotating plate 424 rotates on pivot 425 in the left and right directions. Rotating plate 424 has gear portions 427 and 428 engaging with gears 429a and 430a which are fixed on oscillating member 429 and 430 rotating on pivots 431 and 432, respectively.

FIGS. 30 and 31 show in detail a driving mechanism comprising components from oscillating members 429 and 430 to tape loading blocks 407 and 408 in a state of tapeloading and tape-unloading, respectively.

Arms 433 and 434 are rotatable on pivots 431 and 432 and stop in a state of unloading at the positions where stoppers 437 and 438 fitted on arm 433 and 434 are pressed to engaging portions 439 and 440 formed on oscillating members 429 and 430 according to the force generated from springs 435 and 436 interposed between arms 433 and 434 and oscillating members 429 and 430, respectively. Arms 441 and 442 include one end connected rotatably to arms 433 and 434 through pivots 443 and 444, another end is connected rotatably to tape loading blocks 407 and 408 through pivots 445 and 446, respectively.

In the tape loading mechanism described above, in the state of unloading, magnetic tape 403 is inside of tape cassette 404 and tape loading blocks 407 and 408 are positioned as shown in FIG. 31. At the time of starting loading from this state, gear 421 is rotated by a driving source for tape loading, cam gear 422 rotates in the clockwise direction in FIG. 28, pin 426 moves from the periphery to the inside of cam gear 422 along cam groove 423, and rotating plate 424 rotates on pivot 425 in the clockwise direction. Therefore oscillating members 429 and 430 rotate in the counterclockwise and clockwise directions because gears 429a and 430a engaging with gear portions 427 and 428 rotate counterclockwise and clockwise directions respectively, and tape loading blocks 407 and 408 move along guide grooves 415 and 416.

Since oscillating members 429 and 430 are driven by further rotation of rotating plate 424 in the clockwise direction after tape loading blocks 407 and 408 come into contact with stoppers 413 and 414, tape loading blocks 407 and 408 are pressed to stoppers 413 and 414 by the force generated from extended springs 435 and 436.

In such a conventional magnetic tape recording and playback device, cam groove 423 is needed to be in such a depth that pin 426 does not separate from cam groove 423, and to be formed to the extent of almost 360 degrees. Accordingly because of a problem of strength, the bottom of cam groove 423 is necessary to be thick. Also, it is needed to make the moving distance of pin 426 long and the reduction ratio between gear portions 427 and 428 and oscillating members 429 and 430, large. This is disadvantageous to an achievement of a thin device.

FIGS. 34 and 35 are plan views of the sixth conventional magnetic tape recording and playback device in states of loading and unloading, respectively disclosed in Utility Model Application Laid-Open No. 105938/1986. A chassis 501 is provided with guide grooves 502 and 503 formed on chassis 501, and tape loading blocks 504 and 505. Stoppers 506 and 507 are provided for stopping tape loading blocks 504 and 505 at specific positions. A rotating drum 510 is provided together with a tension arm 511. A tension post 512 and a pin 513 attached on one end and another of tension arm 511, respectively. A pivot 514 is fixed on chassis 501 for supporting tension arm 511 rotatably. A spring 515 is provided for pulling tension arm 511 in the counterclockwise direction. Loading cam member 520 is driven by a motor (not shown). The first sliding lever 521 has slots 524 and 525 in which pins 522 and 523 attached on chassis 501 are inserted so that lever 521 can slide linearly on chassis 501. Lever 521 slides linearly in accordance with the rotation of loading cam member 520 because pin 526 fixed on lever 521 engages with a cam groove (not shown) formed on loading cam member 520. The second sliding lever 527 having rack 528 is mounted on lever 521 so as to be slidable. Pinch arm 529 having pinch roller 531 is supported rotatably on chassis 501 through pin 530. A gear portion 532 engages rack 528, and a capstan 533 is mounted on chassis 501. Arm 534 having pin 534a engaging with groove 536 formed on lever 521 is supported rotatably on chassis 501 through pin 535. A slidable lever 537 includes one end connected with arm 534 and another end includes a slot 539 in which pin 538 fixed on chassis 501 is inserted.

A transmission mechanism (not shown) is interposed between loading cam member 520 and tape loading blocks 504 and 505, so that tape loading blocks 504 and 505 can move according to rotation of loading cam member 520.

The operation will be described below. In the state of loading shown in FIG. 34, tape loading blocks 504 and 505 engage with stoppers 506 and 507, pinch roller 531 is pressed on capstan 533, and a magnetic tape (not shown) is loaded in a specific path so that information can be recorded and played back. At this time tension arm 511 is located in the loading position so as to be able to control a tension of magnetic tape.

When unloading is started, loading cam member 520 is rotated by a motor, and in accordance with the rotation, the first lever 521 moves in the direction of arrow A. Since gear portion 532 is engaging with rack 528, pinch arm 529 is rotated in the direction of arrow B. Arm 534 is rotated by engagement between pin 534a and groove 536, so lever 537 moves in the direction of arrow C. When end 537a of lever 537 engages with pin 513 attached on tension arm 511, tension arm 511 is rotated in the direction of arrow D. Also tape loading blocks 504 and 505 are moved in the directions of unloading by rotation of loading cam member 520 through transmission mechanism.

Rotation of loading cam member 520 achieves the unloading state as shown in FIG. 35, where tape loading blocks 504 and 505, and tension post 512 is located inside of tape cassette 508.

Loading operation will be described below. The operation is reverse to the unloading one. Namely, according to the rotation of a motor, tape loading blocks 504 and 505 move along guide grooves 502 and 503, and engage with stoppers 506 and 507, respectively. Also, the first lever 521, arm 534, and lever 537 move in the directions reverse to the unloading ones by the rotation of loading cam member 520. Since pulled by spring 515 in the counterclockwise direction, tension arm 511 is rotated in the counterclockwise direction while maintaining contact between pin 513 and end 537a of lever 537. When tension arm 511 reaches a specific position, end 537a is separated from pin 513, so that tension arm 511 can control a tape tension.

The conventional magnetic tape recording and playback device described above has the same problems as in the fourth conventional device.

SUMMARY OF THE INVENTION

The object of the invention is to solve the problems stated above.

The second object of the invention is to provide a magnetic tape recording and playback device with reduced number of lead wire connections.

The third object of the invention is to provide a magnetic tape recording and playback device which is thin and compact with more freedom in arrangement of the components.

The fourth object of the invention is to provide a magnetic tape recording and playback device with a tape loading mechanism wherein a drive transmission mechanism comprises a small number of components, dimensional errors among components are eliminated, and the structure takes up a small space.

According to the invention there is provided a magnetic tape recording and playback device comprising a motor for giving a relative movement between a magnetic tape and a magnetic head, the motor comprising a rotor and a stator coil, an electrical circuit for controlling the motor, a board on which the electrical circuit and the stator coils of motor are mounted, and a conductor pattern formed on the board for connecting the stator coil and the electrical circuit.

In the invention there is no need to provide a separate electrical circuit board or lead wires as an interface as in the prior art. Furthermore, the device is much easier to assemble and handle, and the fact that there are no lead wires connecting the motor and electrical circuit also resolves the problem of wire breaks.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
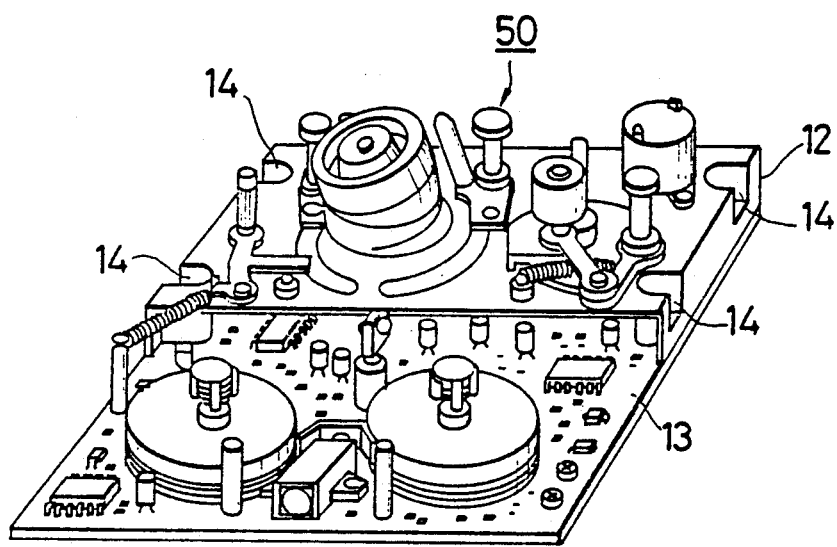
FIG. 1 is a perspective view of a magnetic tape recording and playback device according to an embodiment of the invention.

The first embodiment of the invention will be described below with reference to FIGS. 1 and 2. FIG. 1 is a perspective view of a magnetic tape recording and playback device of the invention. In the figure, a bridge type of mechanical unit 12 is provided on which a mechanism portion is mounted, an integrated circuit board 13 is also provided for carrying motors and an electrical circuit which drives or controls the motors, and screws 14 connect said mechanical unit 12 and integrated circuit board 13. These elements together constitute magnetic tape recording and playback device 50.

Figure 2:
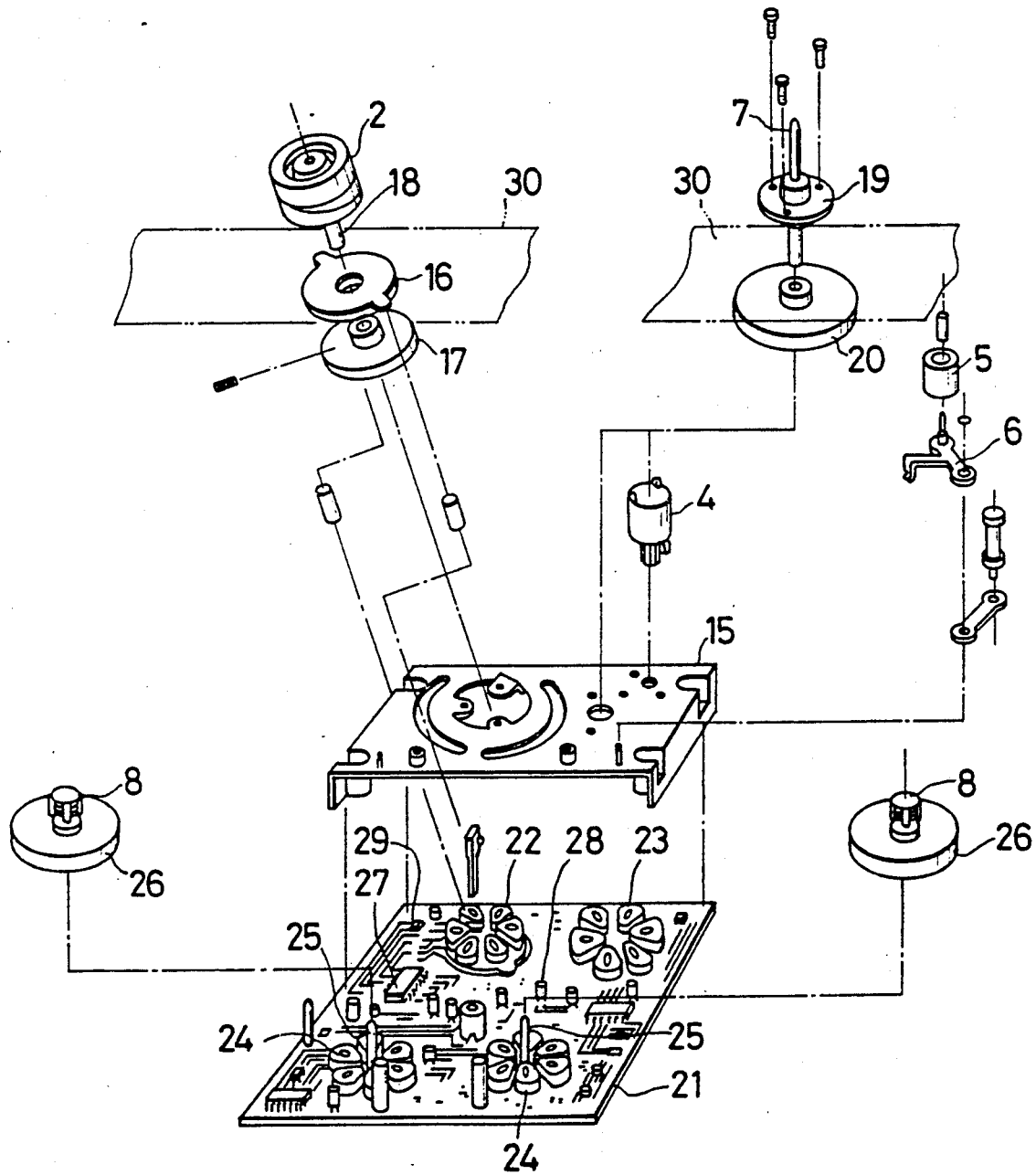
FIG. 2 is an exploded view of the device shown in FIG. 1.

FIG. 2 is an exploded view of said device 50. A rotating drum 2 is provided together with a loading mechanism drive motor 4 and a pinch roller 5, and a pinch arm 6 for supporting pinch roller 5. A capstan 7 is provided together with a pair of reel blocks 8, and a bridge type mechanical chassis 15. A drum base 16 is provided for fixing rotating drum 2 to mechanical chassis 15 and a rotor 17 of the motor is provided for driving rotating drum 2. A drum rotation shaft 18 is mounted adjacent to a capstan bearing 19, and a rotor 20 of the motor for driving capstan 7. These elements together constitute bridge type mechanical unit 12. A metal board 21 includes a film of insulating material and a drum motor stator coil 22. A pair of reel motor stator coils 24 are mounted on the metal board 21. A pair of reel motor shafts 25, and reel motor rotors 26 are mounted thereon. A drive control IC 27 and electronic parts 28, and a conductor pattern 29 is formed on the metal board 21. These elements together constitute an integrated circuit board 13. A magnetic tape 30 is provided thereover.

Figure 3:
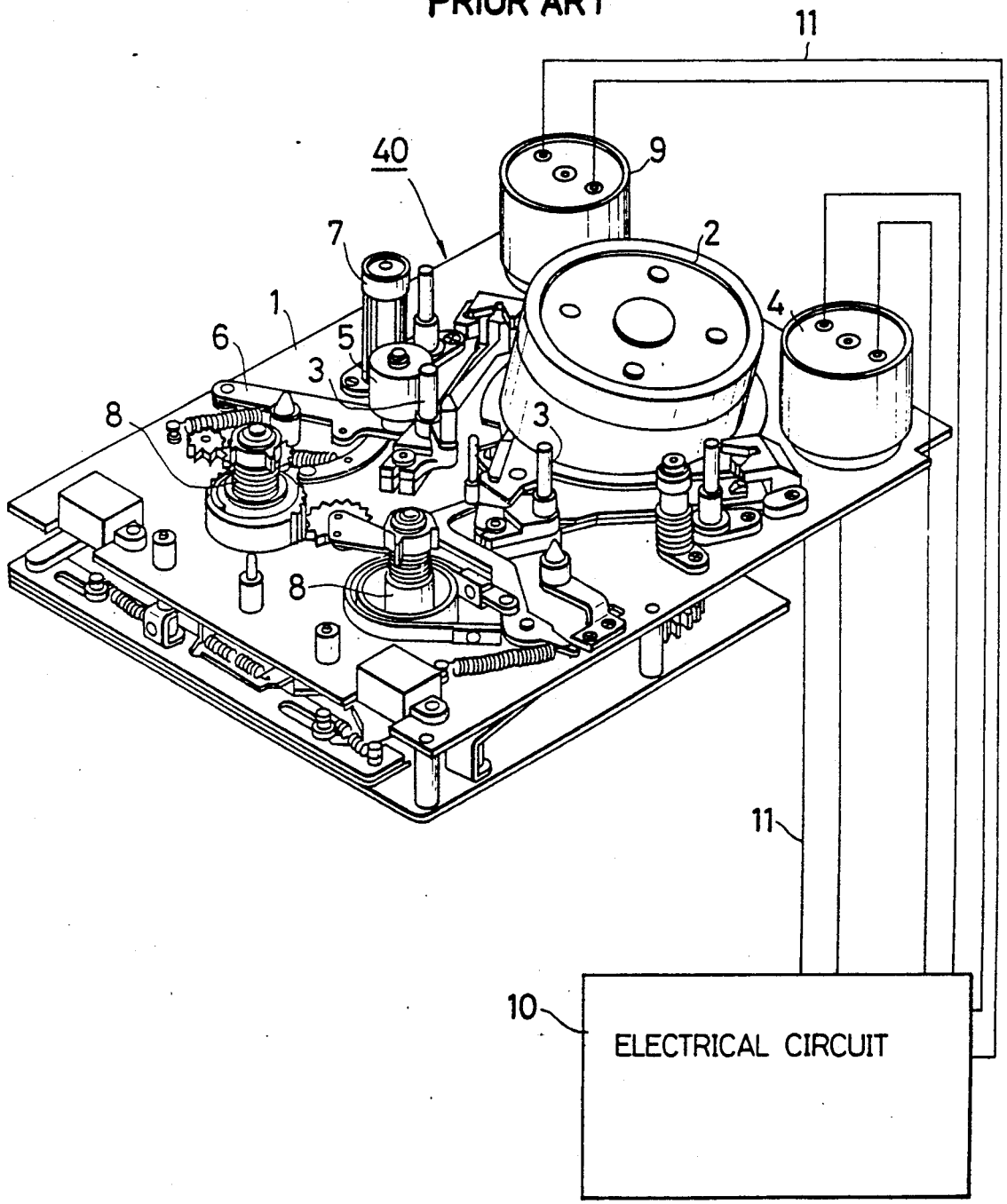
FIG. 3 is a perspective view of a conventional magnetic tape recording and playback device.

The magnetic tape recording and playback device of the above construction is the same as the conventional device shown in FIG. 3 in that the magnetic tape is taken out from the cassette, wound on rotating drum 2, and made to run by pinch roller 5 and capstan 7.

Rotor 17 fixed to rotating shaft 18 of rotating drum 2 confronts stator coil 22 attached on metal board 21 at a slight distance apart from stator coil 22 so that a drum motor is constituted by rotor 17 and stator coil 22. On the other hand, rotor 20 attached to capstan 7 confronts stator coil 23 attached on board 21 at a slight distance apart from stator coil 23 so that a capstan motor is constituted thereby. Furthermore, each reel motor comprises reel motor rotor 26 which engages rotatably with reel motor shaft 25 fixed on metal board 21, and stator coil 24 which is attached on board 21 and confronts rotor 26 at a slight distance apart from it.

These motors are driven and controlled by an electrical circuit comprising drive control IC 27, and electronic parts 28 mounted on the metal board 21.

The interface between the electrical circuit and the motors is provided by conductor pattern 29 formed on metal board 21. Namely, the stator coils 22 to 25 are connected electrically to the electrical circuit through conductor pattern 29.

Figure 4:
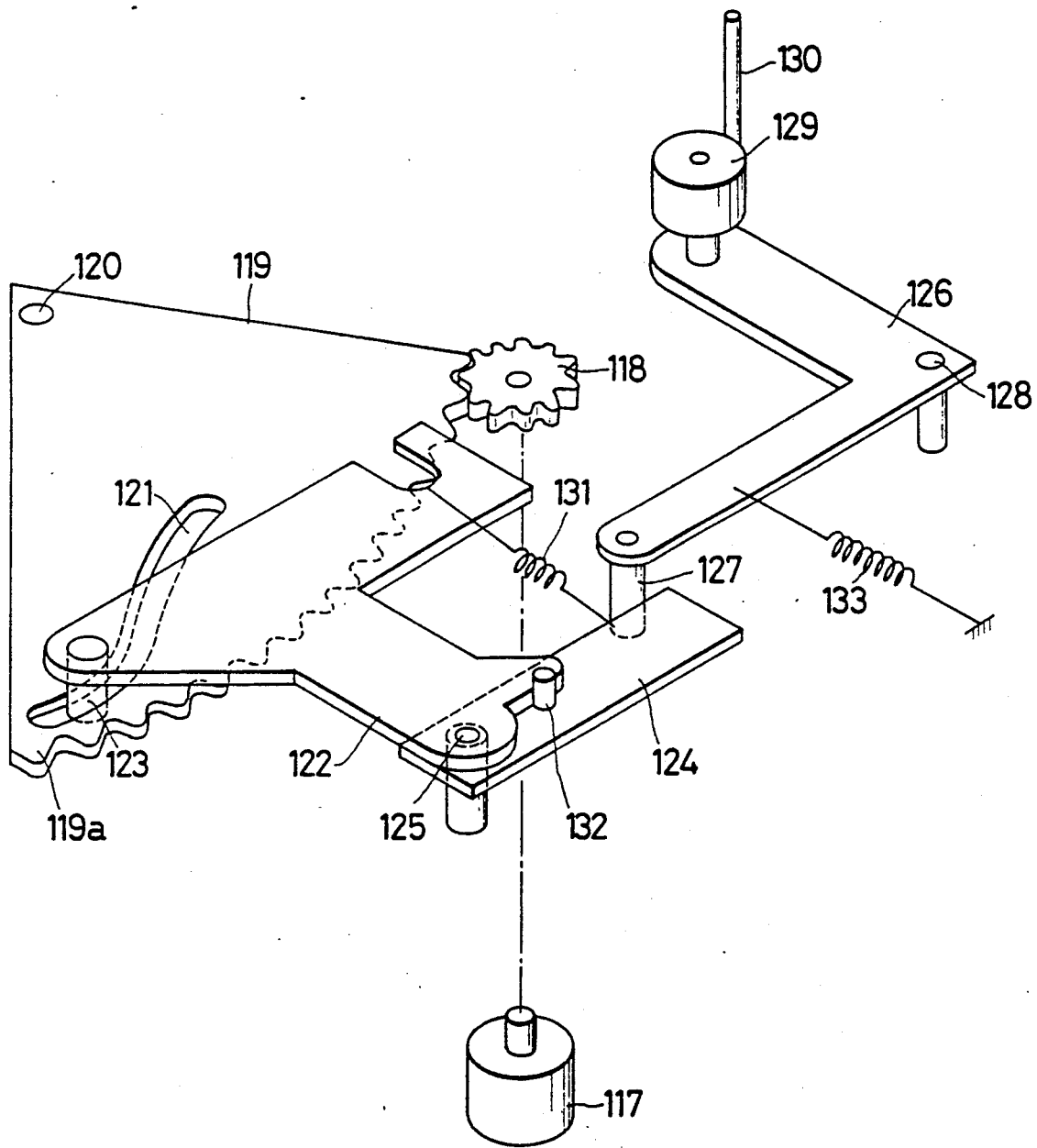
FIG. 4 is a perspective view of a magnetic tape recording and playback device according to the second embodiment of the invention.
Figure 5:
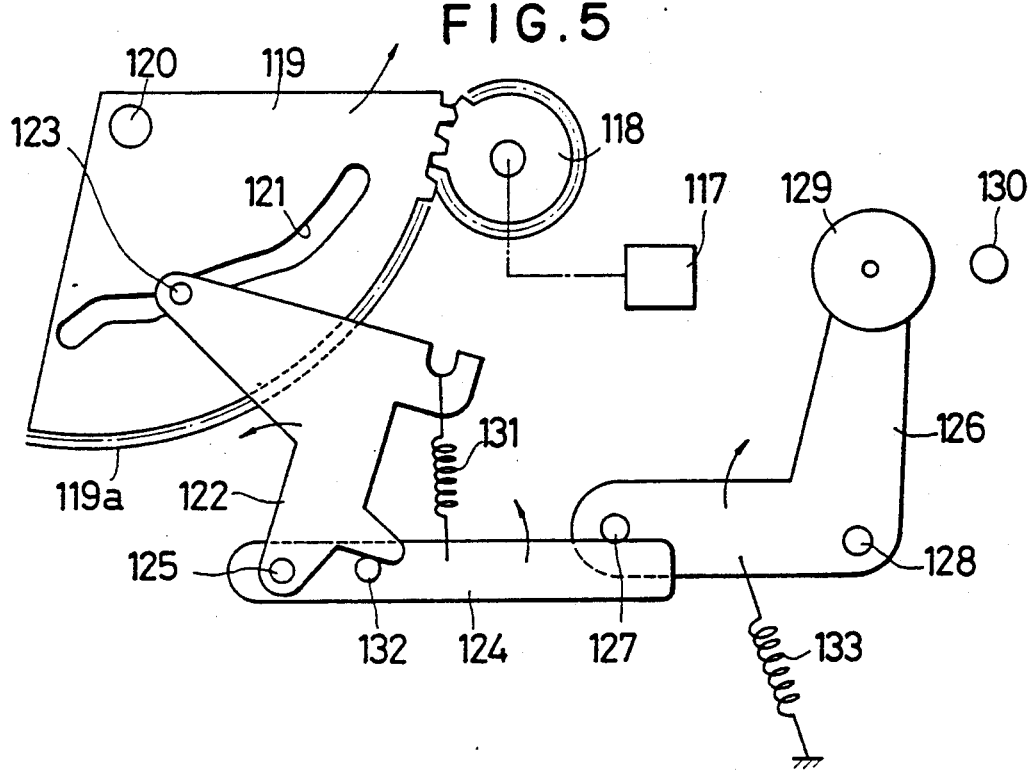
FIGS. 5 and 6 are plan views of a magnetic tape recording and playback device according to the second embodiment of the invention.

The second embodiment of this invention will be explained with reference to FIGS. 4 to 6. In FIG. 4, a drive motor 117 is provided and a gear 118 is driven by drive motor 117. A fan-shaped rotating member 119 is provided with an arc-shaped gear area 119a which engages with gear 118. A pivot 120 is mounted as a center of rotation of the fan-shaped rotating member 119 and a guide groove 121 is formed on fan-shaped rotating member 119. A lever 122 is provided on which pin 123 moving in guide groove 121 is fixed and which rotates on pivot 125. A lever 124 rotates on pivot 125. A lever 126 (pinch arm) is provided on which pin 127 being in contact with lever 124 is attached and which rotates on pivot 128. A pinch roller 129 is fitted to lever 126, and a capstan 130 is mounted adjacent thereto. A spring 131 is interposed between levers 122 and 124. A pin 132 fixed on lever 124, and a spring 133 which pulls lever 126 in the counterclockwise direction.

The operation of this device will be described below. In a state of unloading, each element is in the position shown in FIG. 5, i.e. pin 132 and lever 122 are in contact with each other because of the extending force by spring 131. Furthermore, pin 127 located at one end of lever 126 is in contact with lever 124 because of the extending force by spring 133, while pinch roller 129 and capstan 130 are not in contact each other. When drive motor 117 rotates, its rotation is transmitted via gear 118 to gear area 119a of fan-shaped rotating member 119, and fan-shaped rotating member 119 rotates in the counterclockwise direction on pivot 120 as shown in the figure. Pin 123 which is engaged with guide groove 121 formed on fan-shaped rotating member 119 then receives a force from the side walls of guide groove 121 because of the rotation of rotating member 119. As a result, lever 122 rotates in the counterclockwise direction on pivot 125 and pulls spring 131. Because of this extending force of spring 131, lever 124 also rotates on pivot 125 in the counterclockwise direction, and presses pin 127. Lever 126 then rotates on pivot 128 in the clockwise direction, and pinch roller 129 comes into contact with capstan 130.

Figure 6:
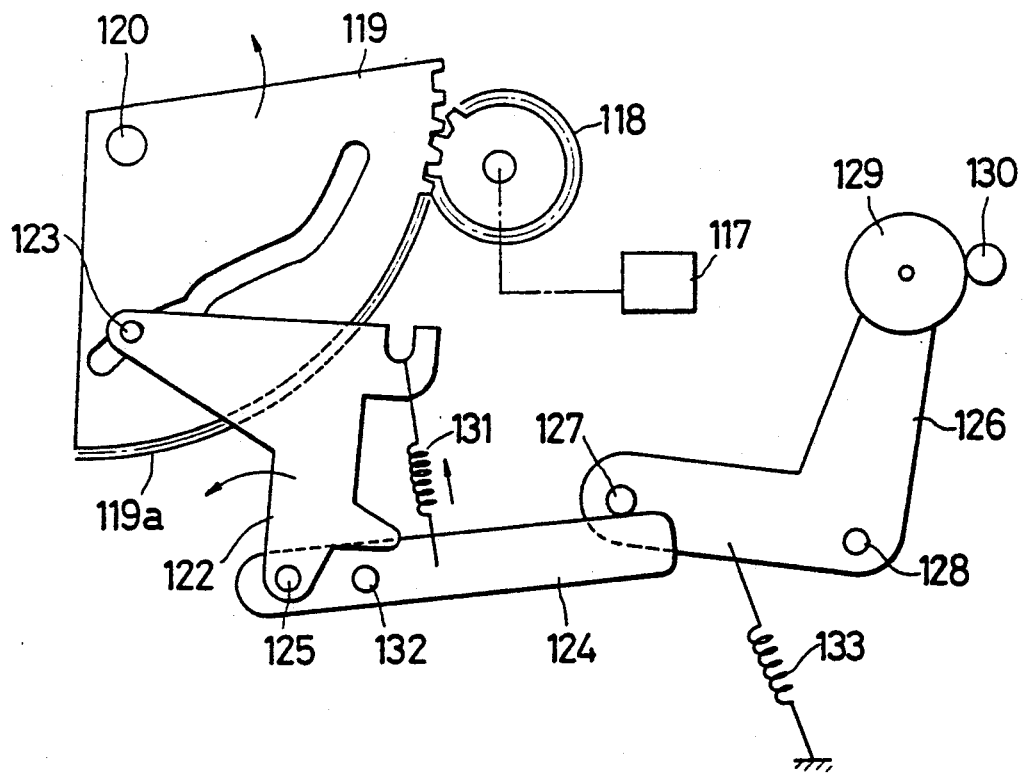
Figure 7:
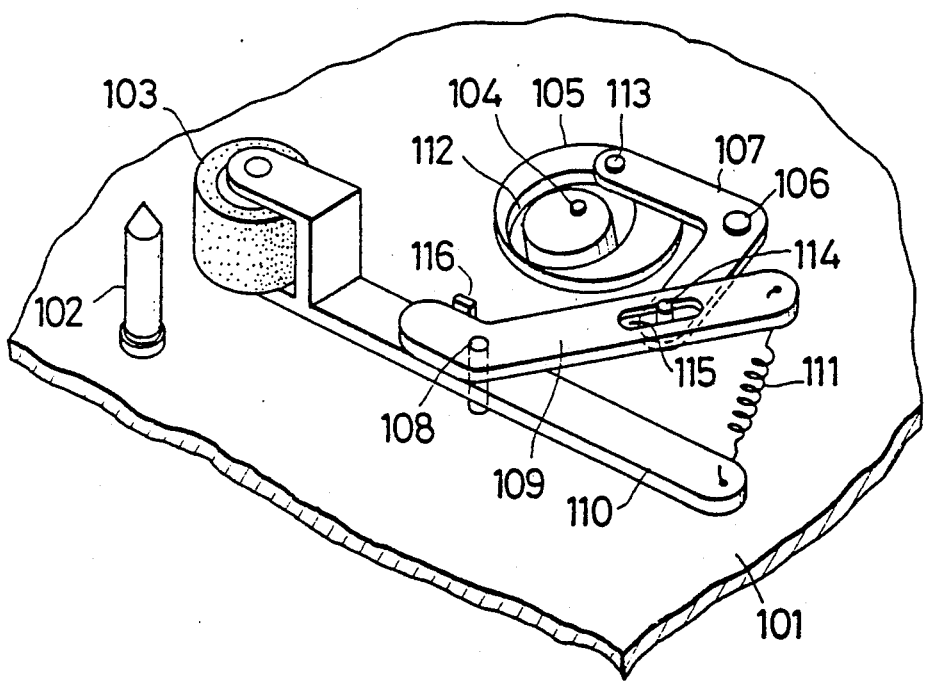
FIG. 7 is a perspective view of the second conventional magnetic tape recording and playback device.

As shown in FIG. 6, after contact of pinch roller 129 and capstan 130, fan-shaped rotating member 119 and lever 122 continue to rotate slightly. However since pinch roller 129 and capstan 130 are already in contact, lever 126 cannot rotate further on pivot 128 in the clockwise direction. Lever 124 therefore also cannot move, and so the force exerted by spring 131 because of further rotation of lever 122, after pinch roller 129 has come into contact with capstan 130, is used as a pressure which maintains pinch roller 129 in contact with capstan 130.

In the above embodiment, each component member has been given the direction of rotation shown in the figures, but it will be understood that other direction combinations are possible.

Also the embodiment can be applied in case of driving a tape tension arm and tape guide post arm.

Figure 8:
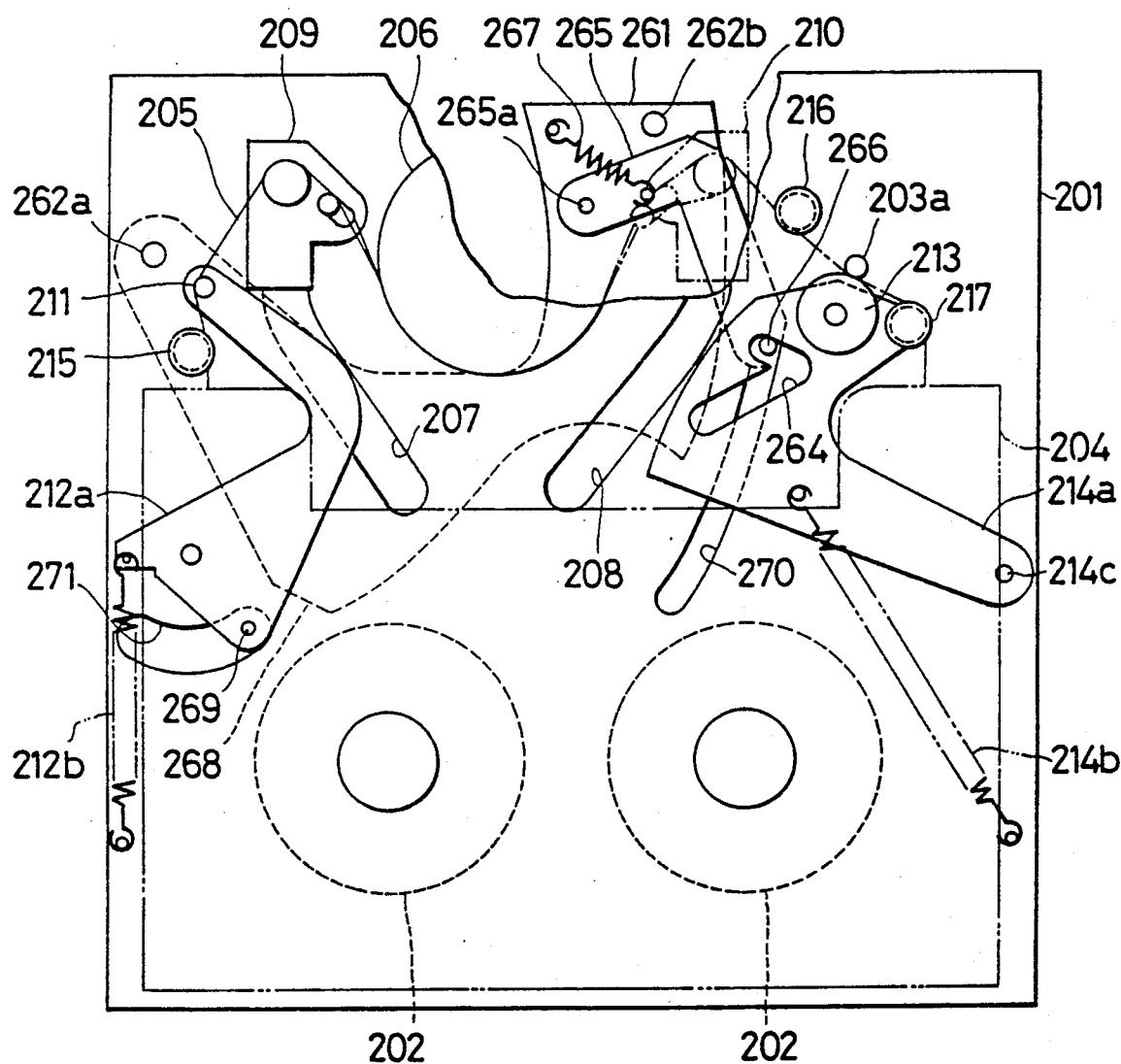
FIG. 8 is a plan view of the essential parts of the third embodiment of the invention in a state of loading showing mainly parts attached to the upper surface of a chassis.
Figure 9:
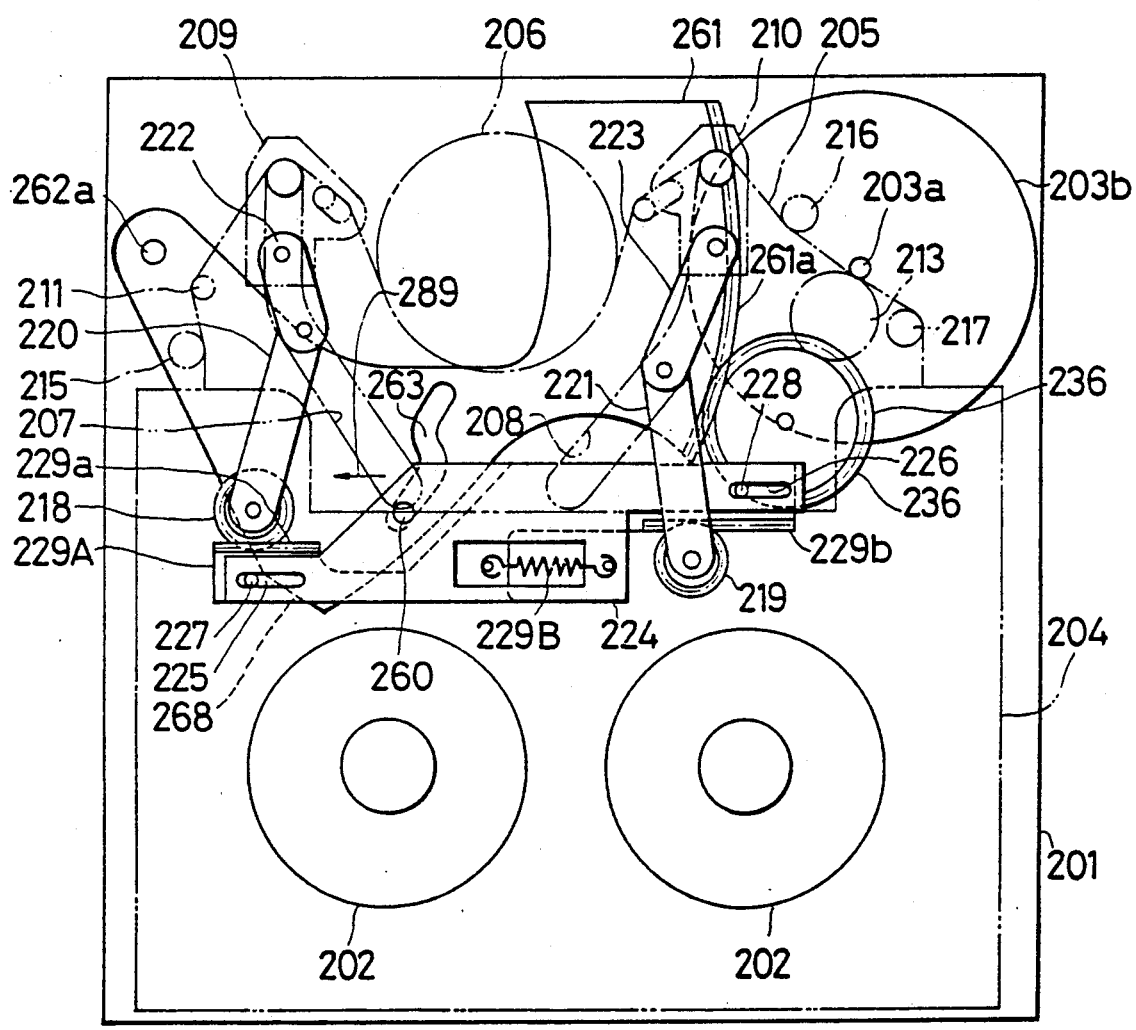
FIG. 9 is a plan view of the essential parts of the embodiment in FIG. 8 showing mainly parts attached to the lower surface of the chassis.
Figure 10:
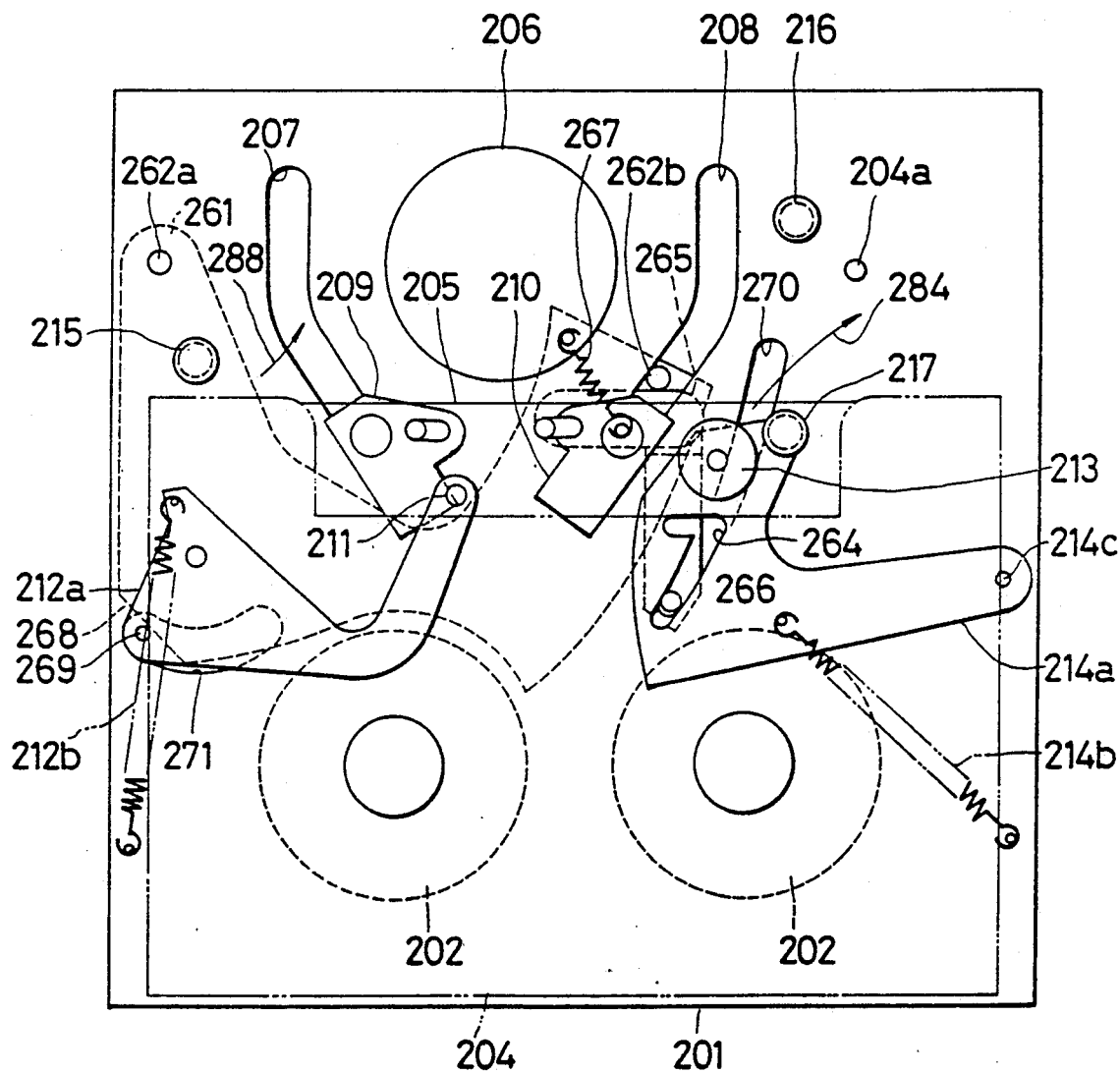
FIG. 10 is a plan view of the essential parts of the third embodiment in a state of unloading showing mainly parts attached to the upper surface of the chassis.
Figure 11:
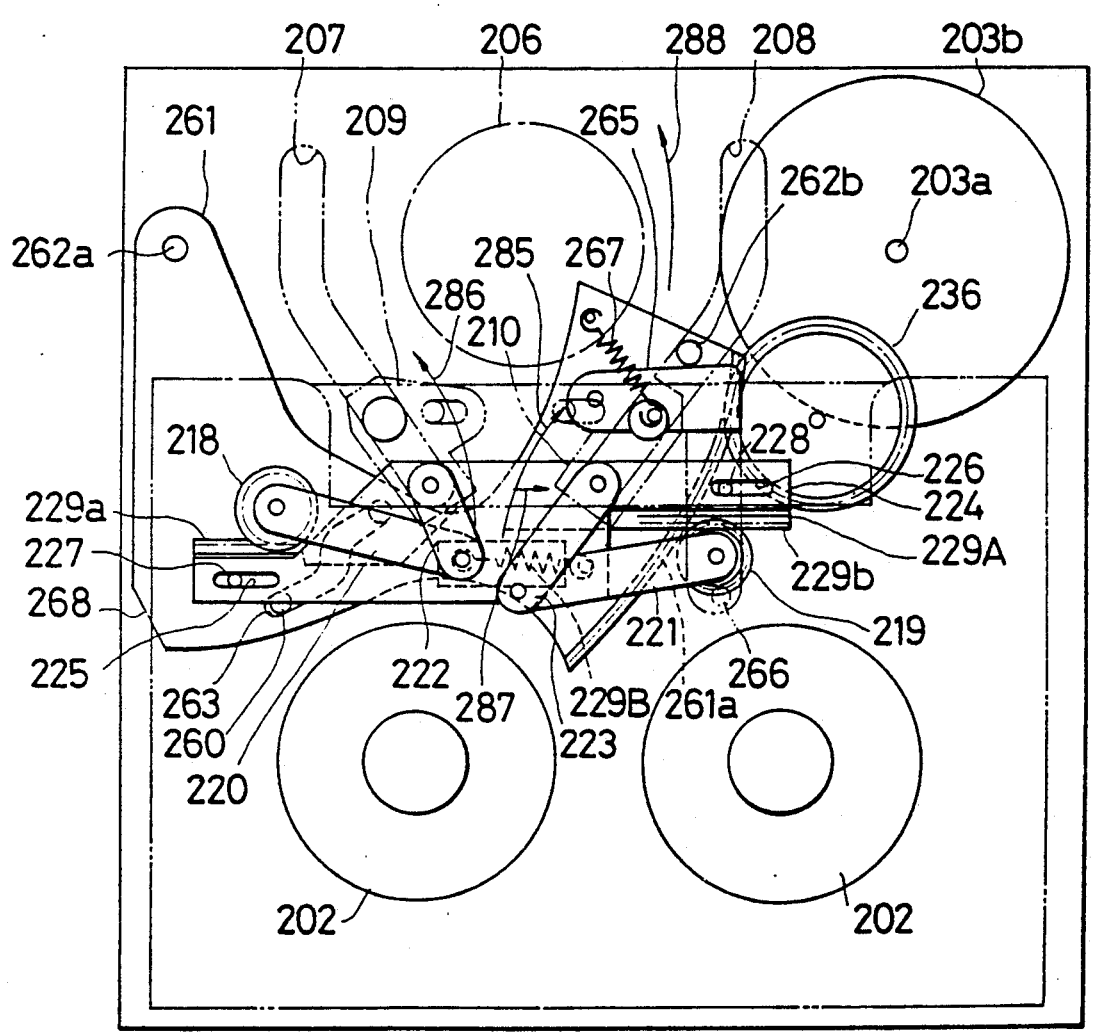
FIG. 11 is a plan view of the essential parts of the embodiment in FIG. 10 showing mainly parts attached to the lower surface of the chassis.
Figure 12:
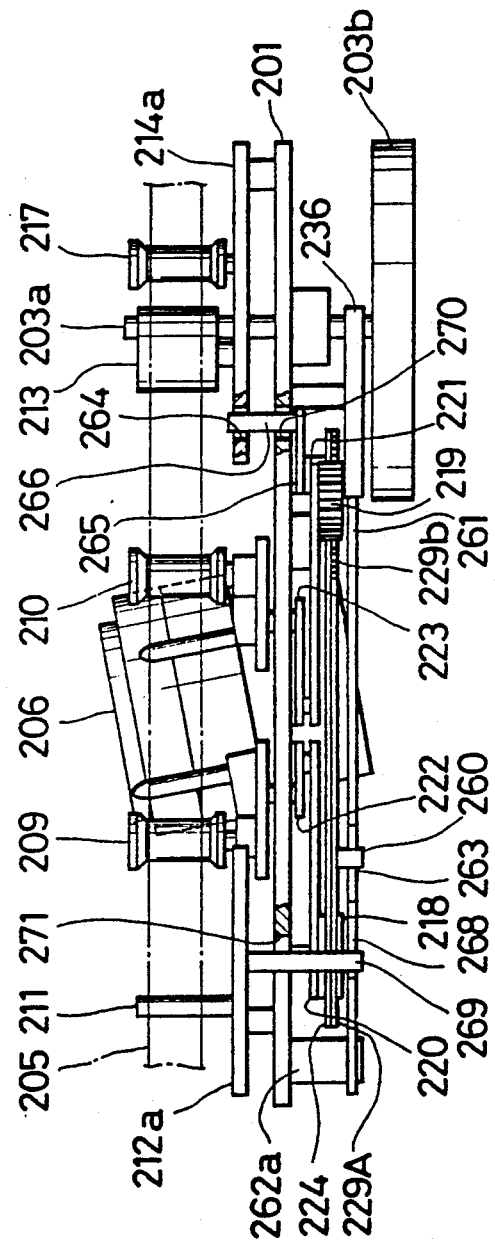
FIG. 12 is a longitudinal section of parts of the third embodiment of the invention.

The third embodiment of the invention will be described below with reference to FIGS. 8 to 12. FIG. 8 is a plan view of the essential parts mounted on the upper surface of a chassis in a state of loading. FIG. 9 is a plan view of the essential parts mounted on the lower surface of the chassis in a state of loading. FIG. 10 is a plan view of the essential parts mounted on the upper surface of the chassis in a state of unloading. FIG. 11 is a plan view of the essential parts mounted on the lower surface of the chassis in a state of unloading. FIG. 12 is a longitudinal section of the parts of device.

Figure 13:
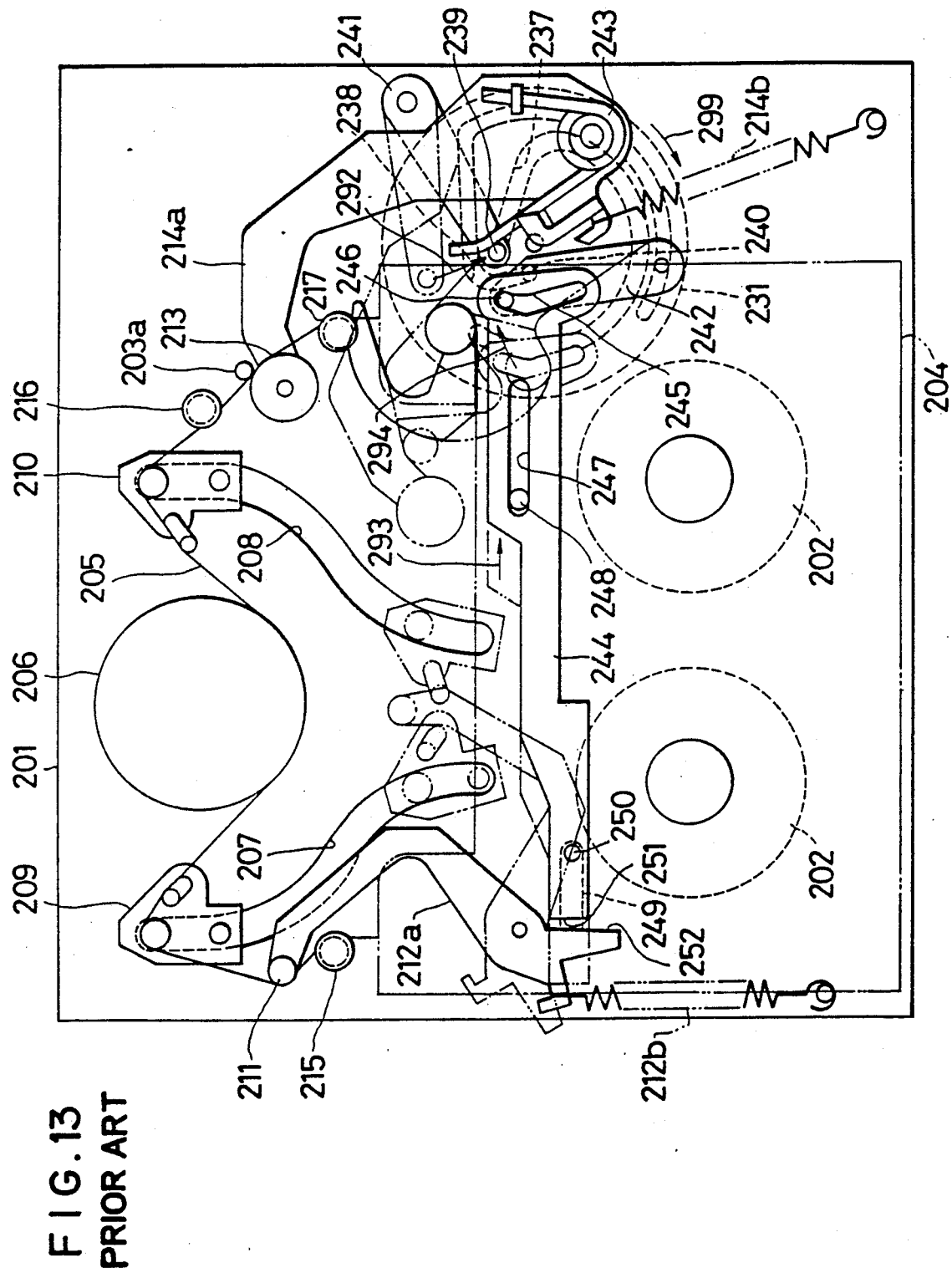
FIG. 13 is a plan view of the essential parts of the third conventional device showing mainly parts attached to the upper surface of a chassis.
Figure 14:
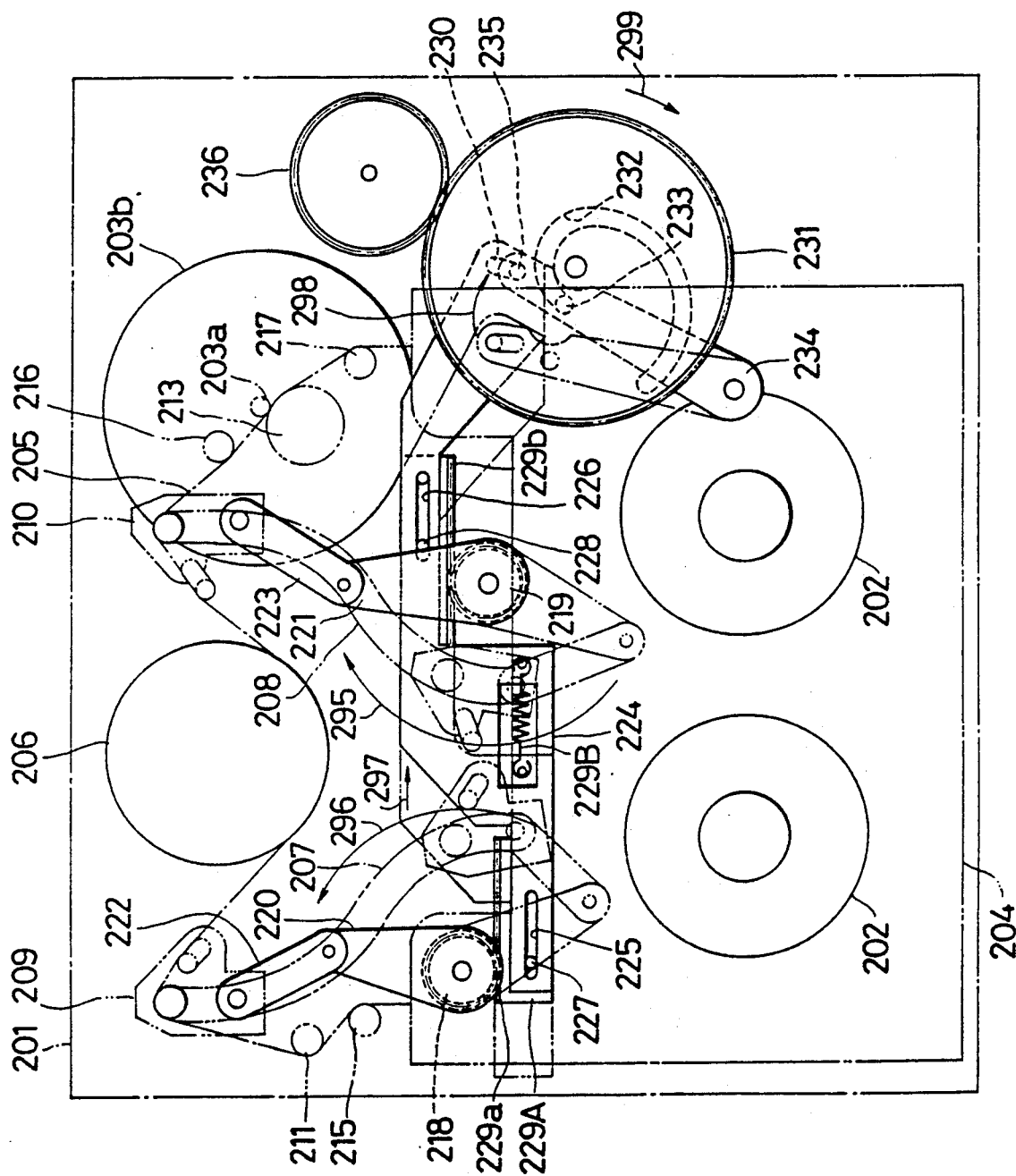
FIG. 14 is a plan view of the essential parts of the third conventional device showing mainly parts attached to the lower surface of the chassis.
Figure 15:
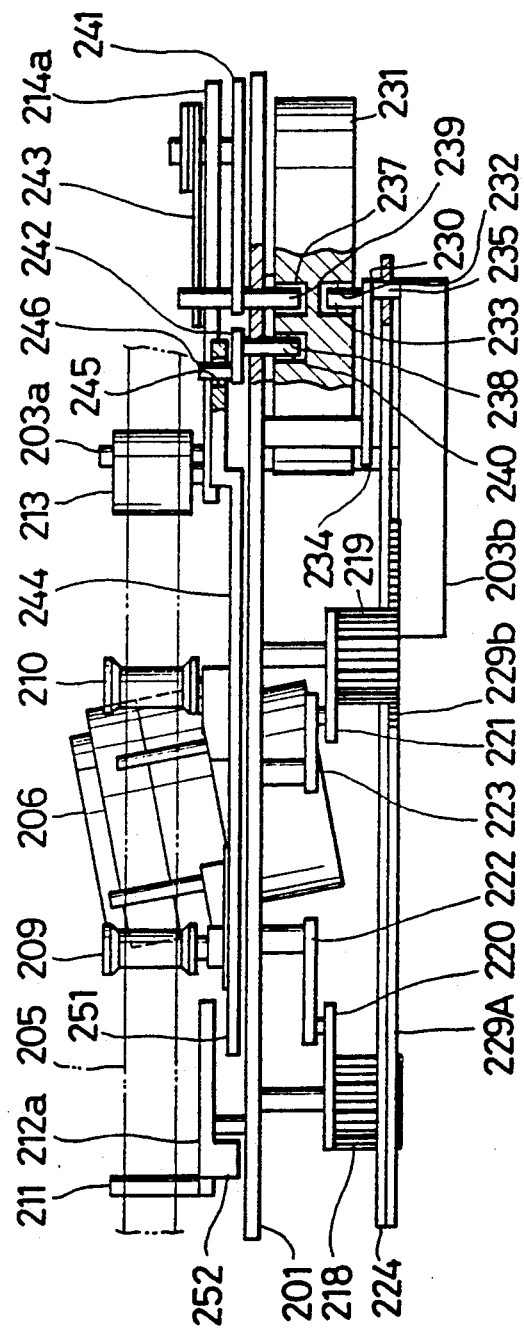
FIG. 15 is a longitudinal section of parts of the third conventional device.

Elements which are identical or equivalent to those in the conventional device shown in FIGS. 13 to 15 are given identical numbers, and further description of them is omitted.

In the figures, a pin 260 is mounted on a lower slider 224. A fan-shaped rotating member 261 is supported underneath chassis 201 such that it can rotate on pivot 262a fixed on chassis 201. Also rotating member 261 has in its circumference a gear portion 261a which engages with drive gear 236. A projection 262b is formed on rotating member 261. Guide grooves 263 and 264 are formed on rotating member 261 and pinch arm 214a, respectively. A pressure member 265 is mounted on rotating member 261 such that it can rotate on pivot 265a. A pin 266 is fixed on pressure member 265 such that it engages with guide groove 264. An extension spring 267 includes one end attached to rotating member 261; another end is attached to pressure member 265. A pressure portion 268 is formed on rotating member 261, a pin 268 is attached to tension arm 212a, and 270 and 271 are slots formed on chassis 201.

The operation of the device will be explained below. FIGS. 10 and 11 show the device in the 1st position where tape loading blocks 209 and 210, tension pin 211, and pinch roller 213 are inside of tape cassette 204, i.e. in the position of unloading. FIGS. 8 and 9 show the device in the 2nd position where tape 205 has been taken out from cassette 204 and brought into contact with rotating drum 206, i.e. in the loading position. In FIGS. 10 and 11 the loading begins by starting a loading motor (not shown in the figure). The motor torque is transmitted to drive gear 236, and rotating member 261 which has gear portion 261a engaging with gear 236 rotates in the direction of arrow 288. Following this motion, pin 260 slides along guide groove 263 in FIG. 11, and lower slider 224 moves in the direction of arrow 287. Also at this time pressure member 229A is pulled by lower slider 224 through spring 229B and moves in the same direction as lower slider 224. Gears 218 and 219 which are engaged with racks 229a and 229b of pressure member 229A rotate, and arms 220 and 221 rotate in the directions of arrows 286 and 285, respectively. Tape loading blocks 209 and 210 move to the position shown in FIGS. 8 and 9 while maintaining contact with tape 205, and extension spring 229B extends so as to press and fix tape loading blocks 209 and 210 against the ends of guide grooves 207 and 208.

Simultaneously, when rotating member 261 rotates in the direction of arrow 288 pressure portion 268 is separated from pin 269. Tension arm 212a therefore rotates to the position where the tension in magnetic tape 205 balance the force exerted by extension spring 212b.

According to the rotation of rotating member 261, pressure member 265 which is mounted on rotating member 261 through pivot 265a moves together with rotating member 261. Since pin 266 fixed on pressure member 265 is engaging with guide groove 264 formed on pinch arm 214a, pinch arm 214a rotates on pivot 214c attached to chassis 201 in the direction of arrow 284. After pinch roller 213 comes into contact with capstan 203a, rotating member 261 rotates a little further, so extension spring 267 extends so as to give the pressure to pinch roller 213 as shown in FIG. 8.

At the time of unloading, the loading motor (not shown in the figure) rotates in the direction reverse to that in loading, and rotating member 261 moves in the direction reverse to arrow 288 under the action of the torque exerted by drive gear 236. Following this motion, as shown in FIG. 9, lower slider 224 moves in the direction of arrow 289 according to the sliding of pin 260 in guide groove 263, and tape loading blocks 209 and 210 return to the position shown in FIG. 11. At the same time, as shown in FIG. 10, pressure portion 268 presses pin 269 and makes tension arm 212a rotate in the clockwise direction in opposition to the force of extension spring 212b. Pressure member 265 also moves together with rotating member 261 while maintaining contact with projection 262b, pin 266 slides along guide groove 264, and pinch arm 214a is pulled back to its original position by extension spring 214b as shown in FIG. 10.

In the above embodiment, it is assumed the loading mechanism is that found in a magnetic tape recording and playback device where capstan 203a is situated outside of tape cassette 204 (e.g. R-DAT, β-VTR). It may however also be the mechanism found in a VHS-VTR or S-DAT where the capstan is situated inside of the tape cassette.

Furthermore, in the above embodiment it is also assumed that rotation pivot 262a of rotating member 261 is situated beside rotating drum 206, and that the member rotates to the extent of an angle of about 28°. The rotation pivot may however be situated elsewhere and the member may rotates by a different angle.

Figure 16:
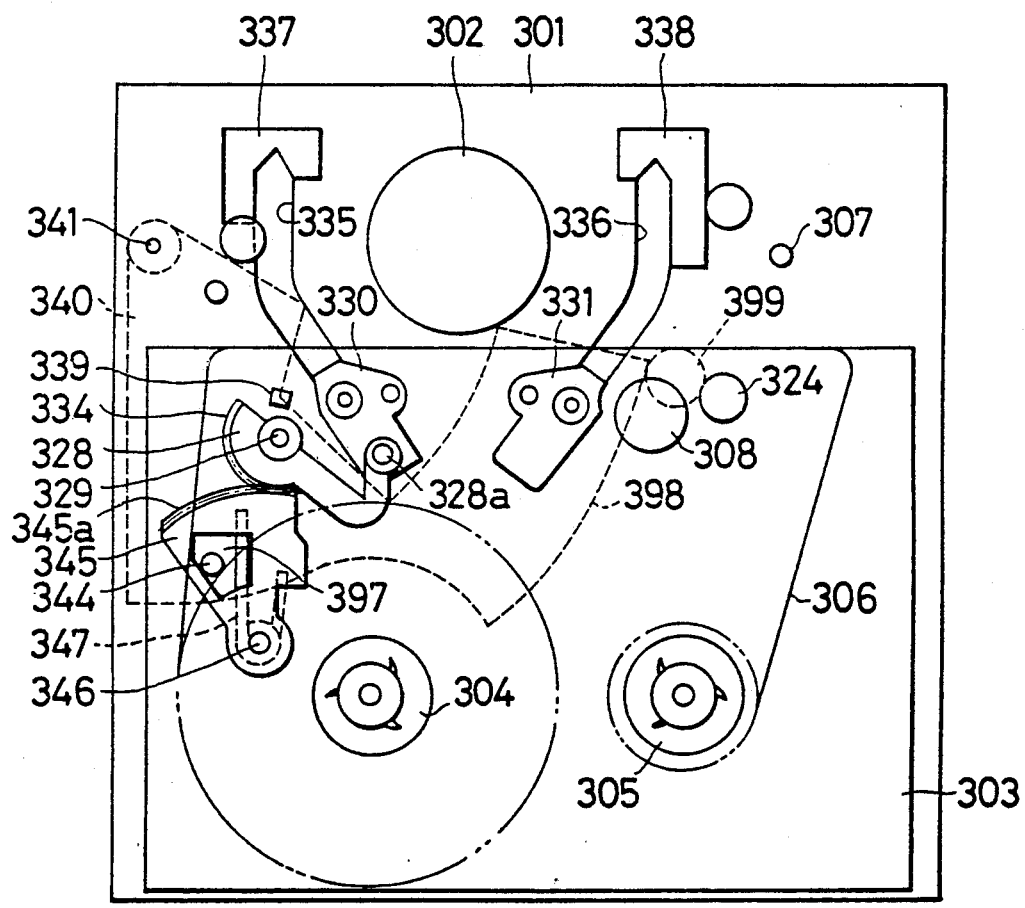
FIG. 16 is a plan view of the fourth embodiment of the invention in a state of unloading.
Figure 17:
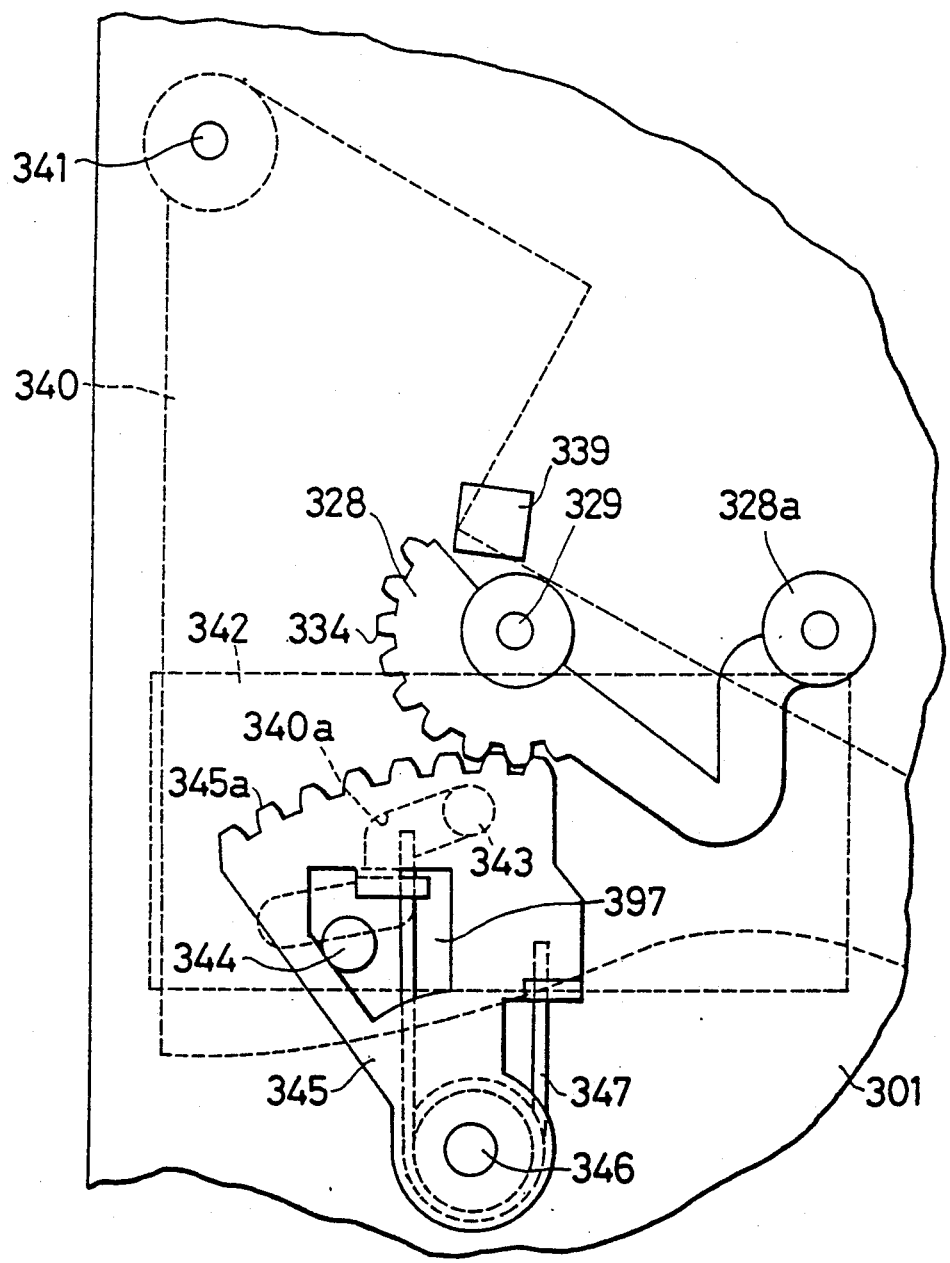
FIG. 17 is an enlarged view of the essential parts of the embodiment in FIG. 16.
Figure 18:
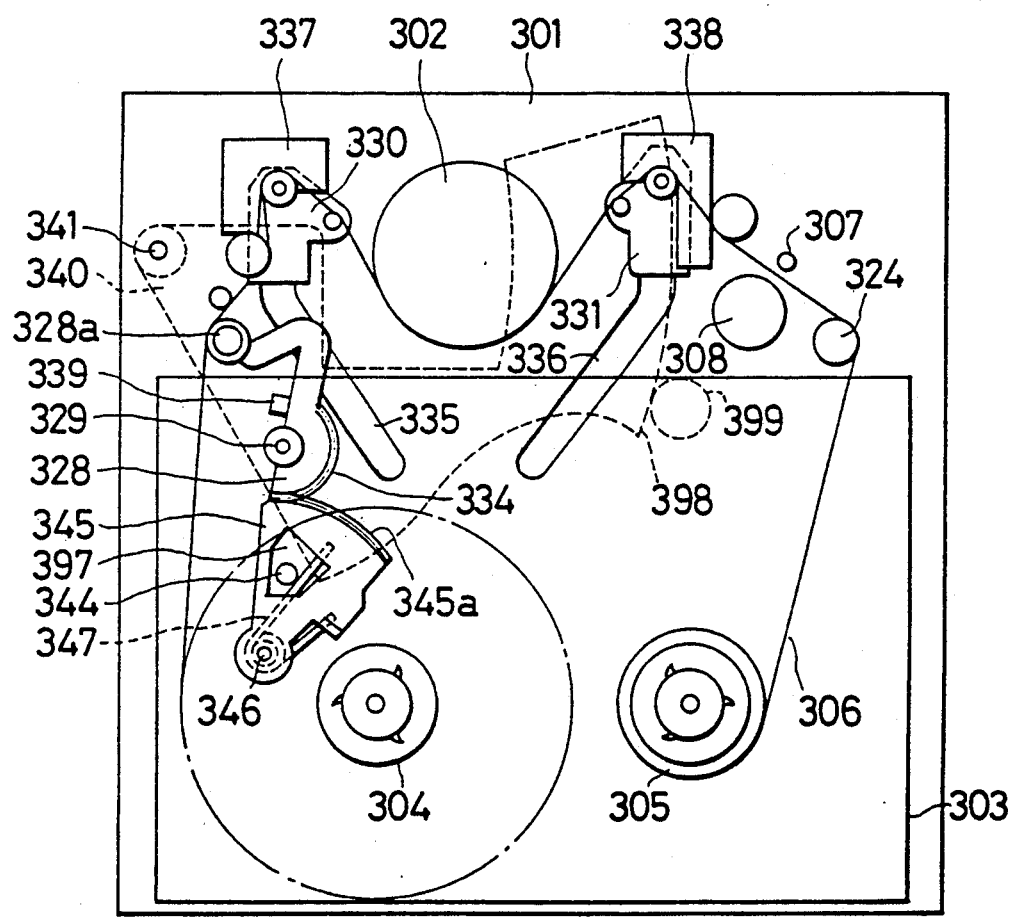
FIG. 18 is a plan view of the fourth embodiment of the invention in a state of loading.
Figure 19:
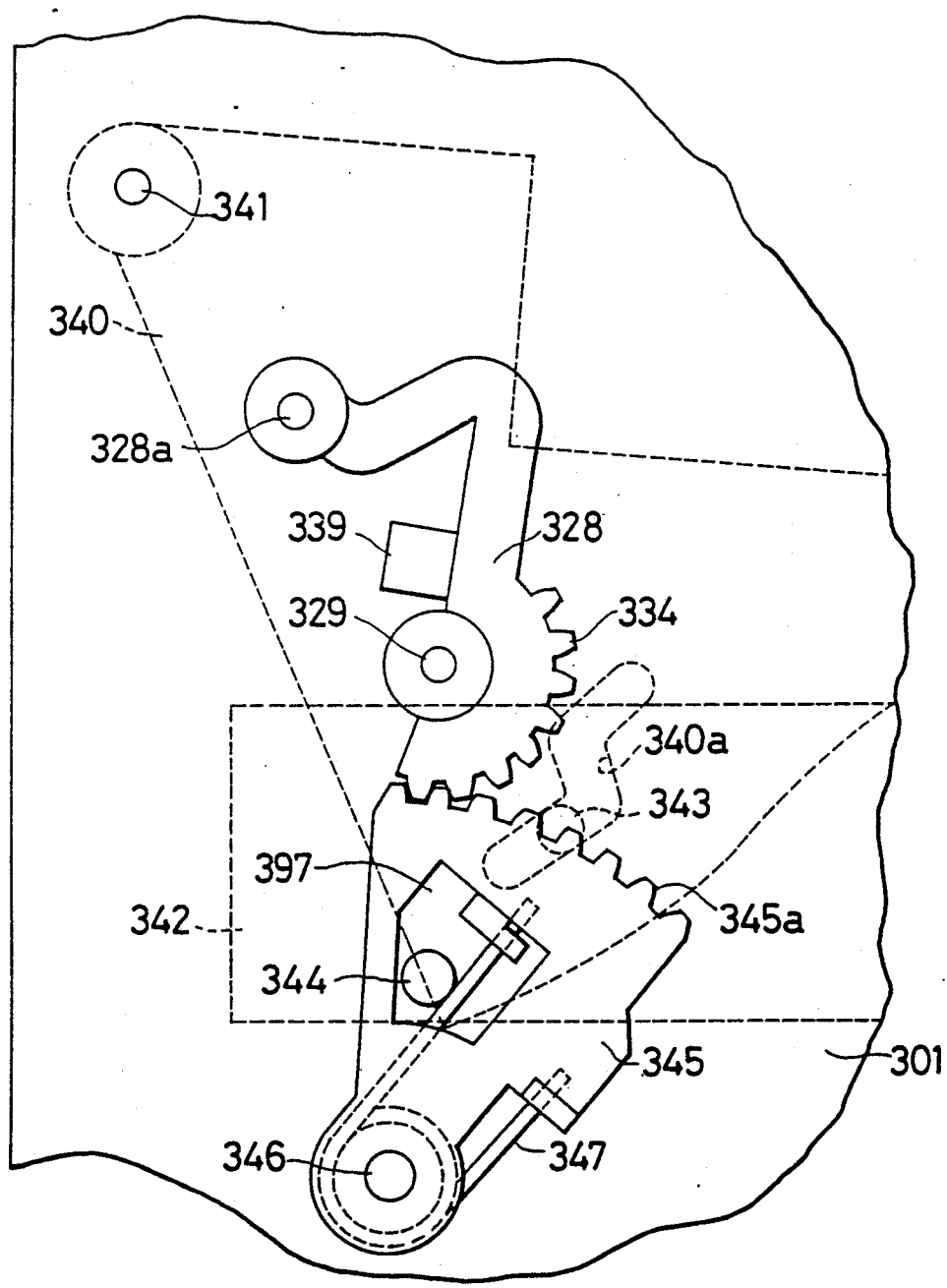
FIG. 19 is an enlarged view of the essential parts of the embodiment in FIG. 18.

The fourth embodiment of the invention will be described below with reference to FIGS. 16 to 19. FIG. 16 is a plan view of the fourth embodiment in a state of unloading, FIG. 17 is an enlarged view of the essential parts of the embodiment in FIG. 16, FIG. 18 is a plan view of the fourth embodiment in a state of loading, and FIG. 19 is an enlarged view of the essential parts of the embodiment in FIG. 18.

Figure 20:
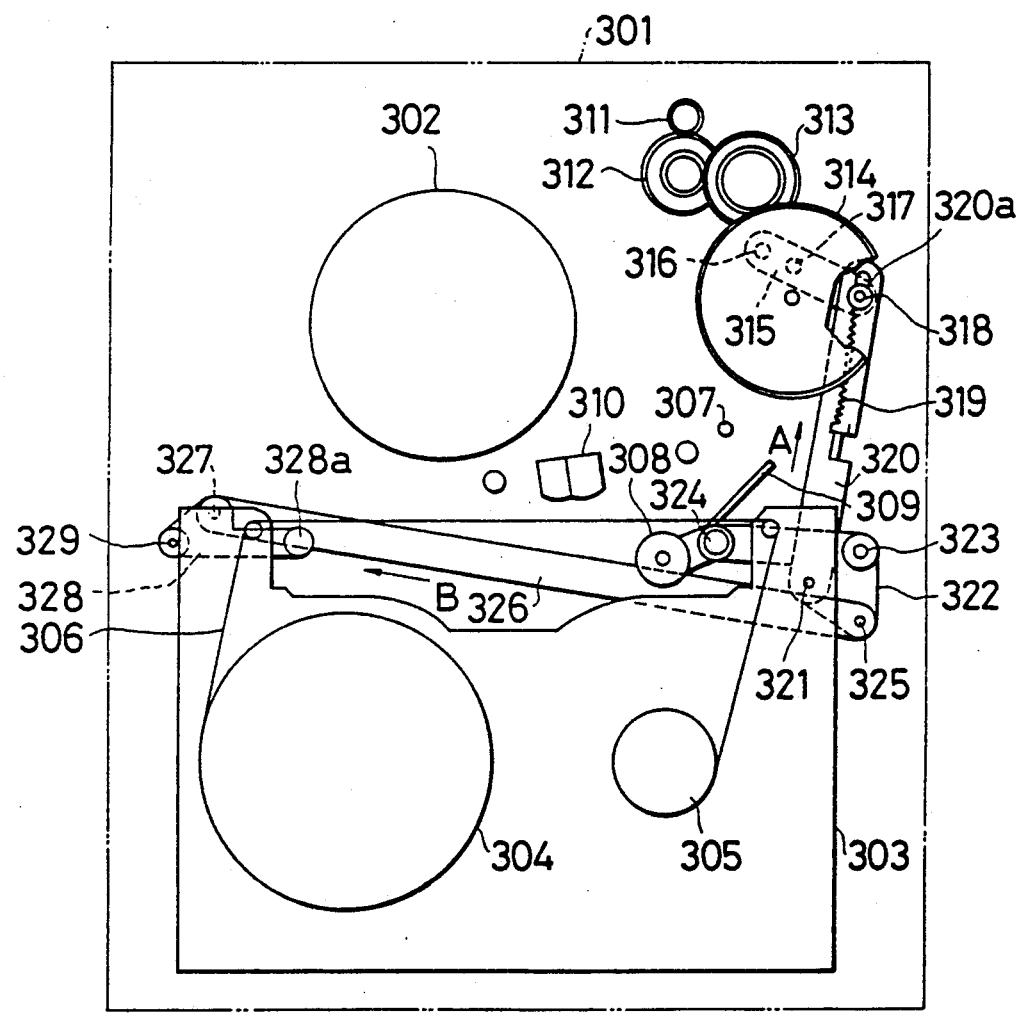
FIG. 20 is a plan view of the fourth conventional magnetic tape recording and playback device in a state of unloading.
Figure 21:
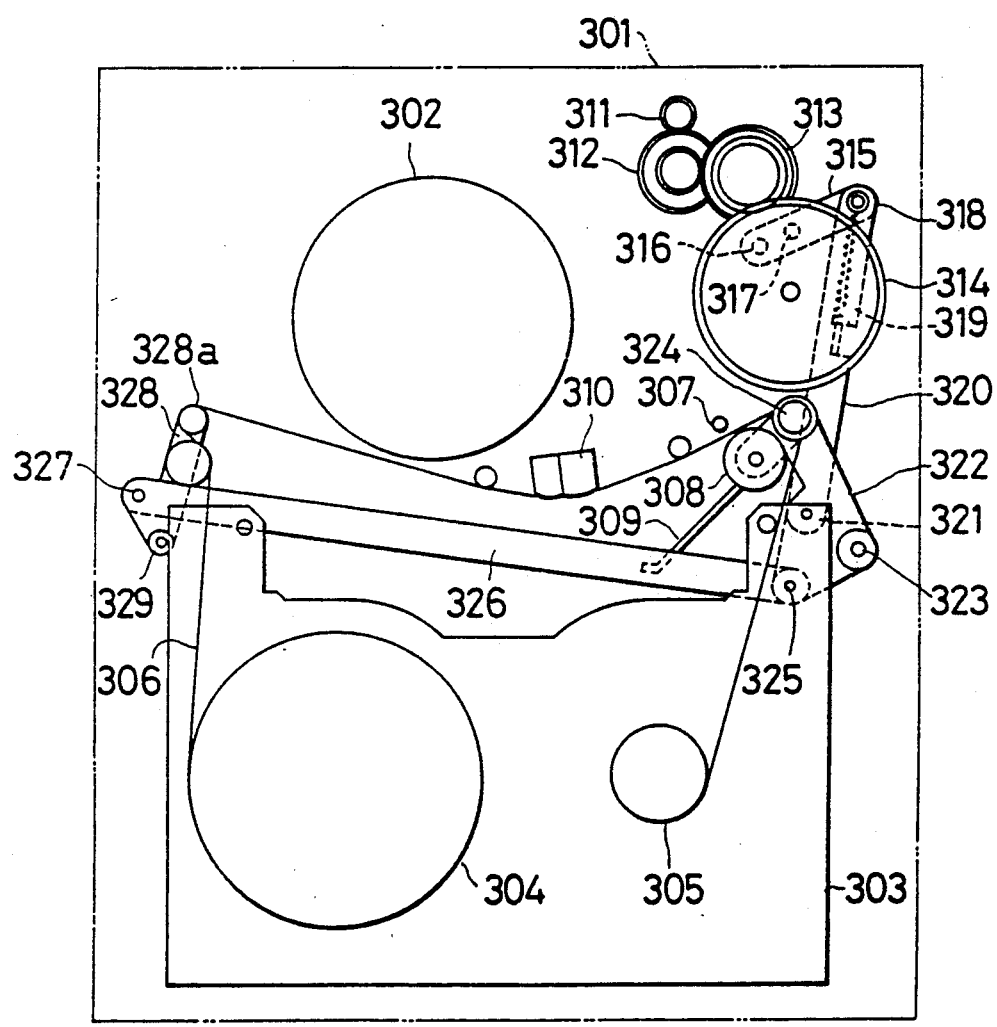
FIG. 21 is a plan view of the fourth conventional device in a state of half-loading position.
Figure 22:
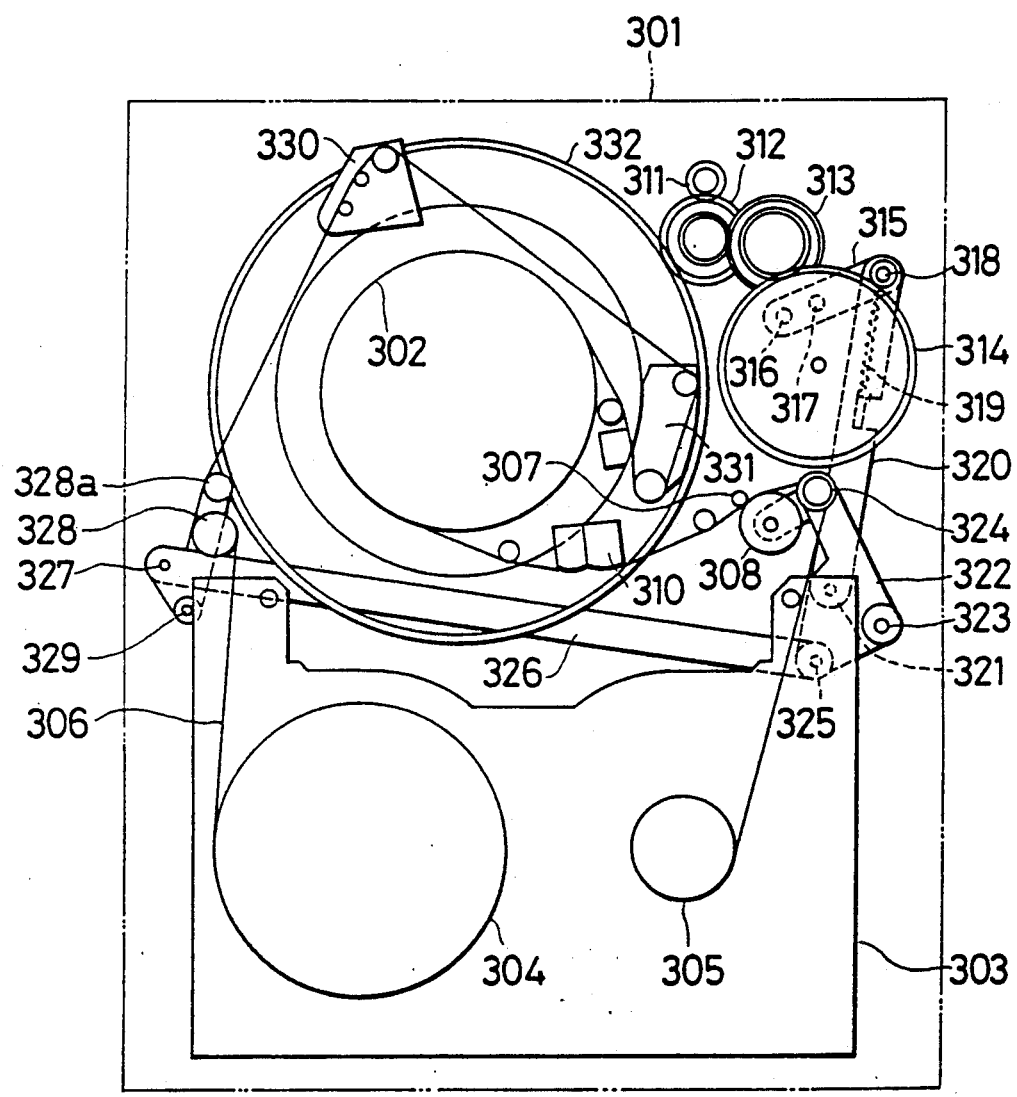
FIG. 22 is a plan view of the fourth conventional device in a state of loading.

Identical or equivalent elements to those in said conventional device shown in FIGS. 20 to 22 are given identical numbers, and their descriptions are therefore omitted.

In the figures, a gear area 334 is formed on tape guide arm 328. Tape guide grooves 335 and 336 are formed on chassis 301 to guide tape loading blocks 330 and 331. Stoppers 337 and 338 stop tape loading blocks 330 and 331 at specific positions, and an arm stopper 339 which stops tape guide arm 328 at a specific position. A fan-shaped rotating member 340 is attached to the lower surface of chassis 301 so as to rotate on pin 341 fixed on chassis 301. A guide groove 340a is formed on fan-shaped rotating member 340, and a slider 342 is installed on the lower surface of chassis 301 so as to slide to the left and right. A pin 343 which is fixed on slider 342 and engages with guide groove 340a, and a transmission pin 344 is fixed on slider 342. An arm gear 345 is located on the upper surface of chassis 301 so as to rotate on pin 346 fixed on chassis 301, and its gear area 345a engages with gear area 334 formed on tape guide arm 328. A spring 347 includes in the center the pin 346 which is inserted and both ends are attached to arm gear 345. A gear 339 which is driven by a motor not shown and engages with gear portion 398 formed on the periphery of rotating member 340.

The operation of the device will be described below. In FIGS. 16 and 17, when gear 399 is driven by a motor, since gear portion 398 engages with gear 399, fan-shaped rotating member 340 rotates on pin 341 in the loading direction, i.e. in the counterclockwise direction. At this time slider 342 moves to the right since pin 343 fixed on slider 342 is guided by guide groove 340a formed on rotating member 340, and the transmission pin 344 of slider 342 also moves to the right. When pin 344 comes into contact with one end of spring 347, arm gear 345 is rotated in the clockwise direction by another end of the spring, and tape guide arm 328 is rotated on pin 329 in the counterclockwise direction because gear portions 345a and 334 engage each other. When engaged with arm stopper 339, tape guide arm 328 stops. Tape guide arm 328 is held in the position by the force of coil spring 347 which is generated by further movement of slider 342. Because of these operations, the device reaches the loading position as shown in FIGS. 18 and 19.

At the time of unloading, rotating member 340 is rotated in the clockwise direction and slider 342 slides to the left. When slider 342 reaches a specific position, pin 344 which moves in hole 397 formed on arm gear 345 engages with the left edge of hole 397. Therefore arm gear 345 and tape guide arm 328 rotate in the counterclockwise and clockwise directions, respectively. Thus the device reaches the unloading position as shown in FIGS. 16 and 17.

Figure 23:
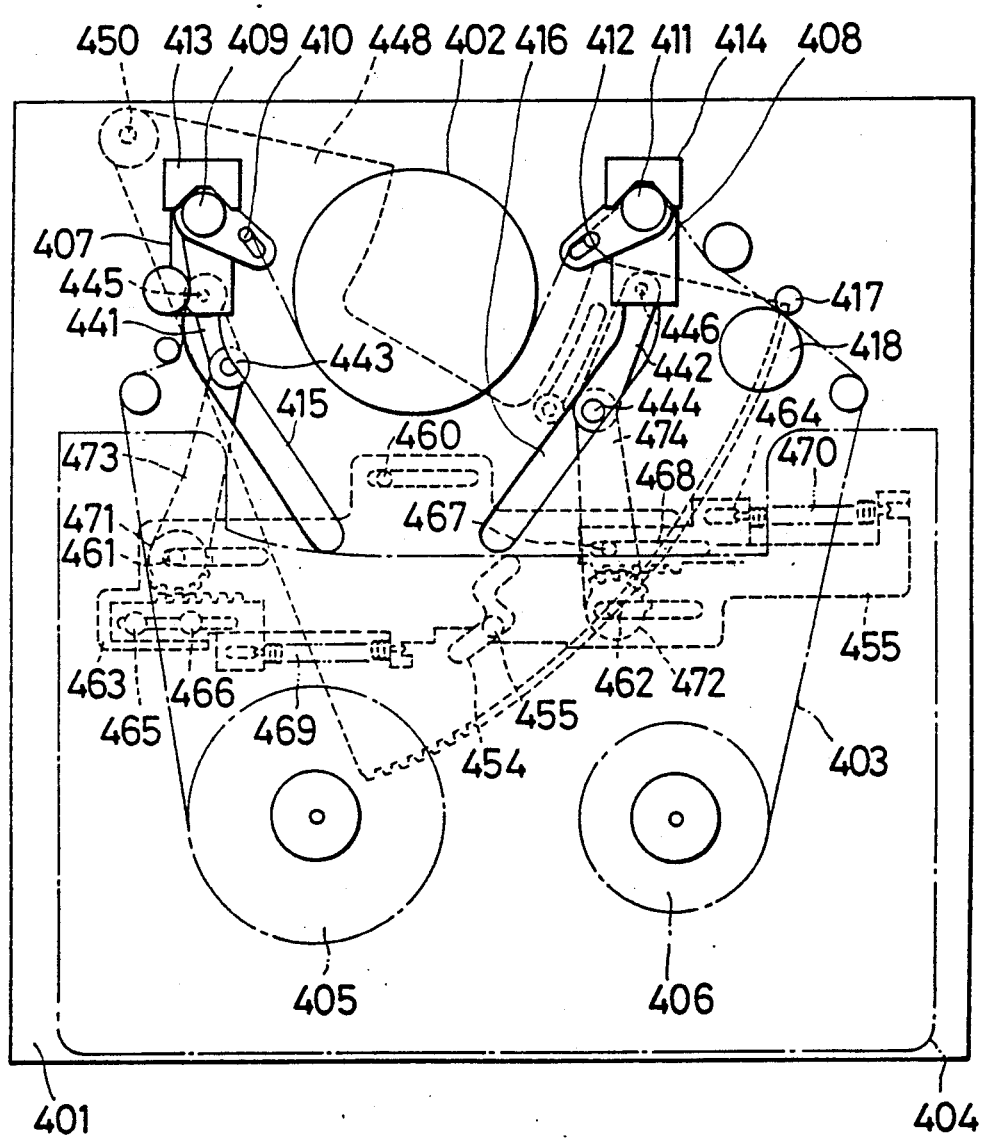
FIG. 23 is a plan view of the fifth embodiment of the invention in a state of loading.
Figure 24:
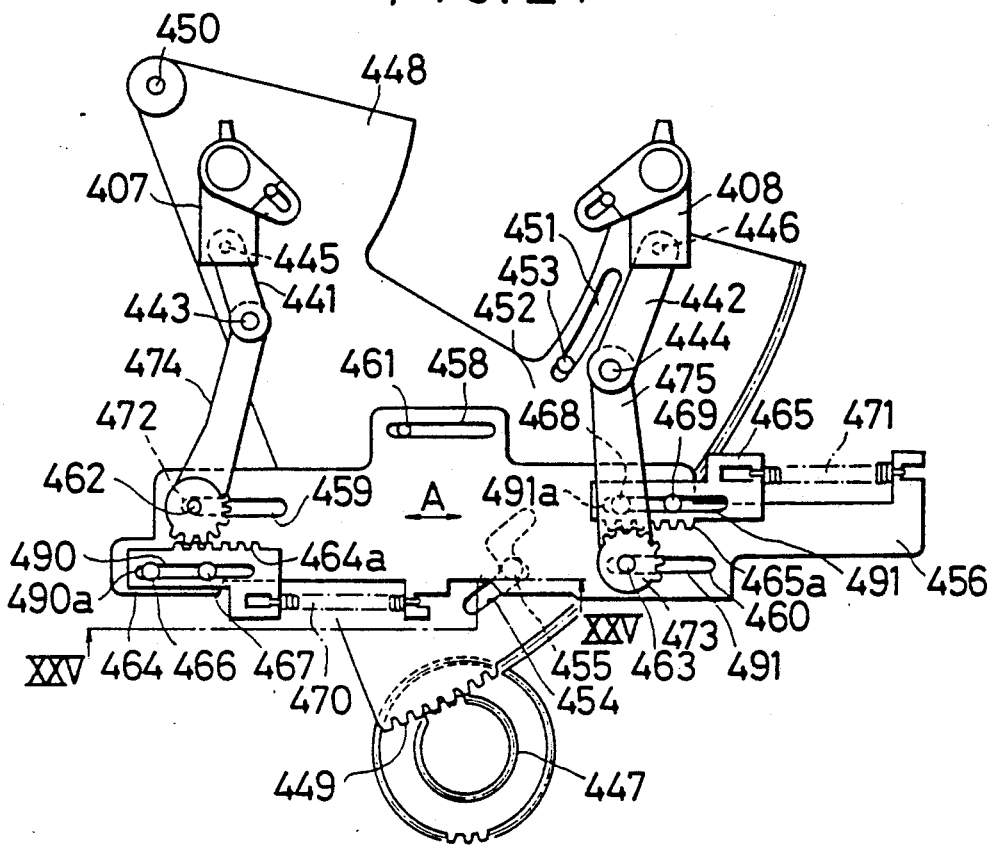
FIG. 24 is a plan view of a tape loading mechanism shown in FIG. 23.
Figure 25:
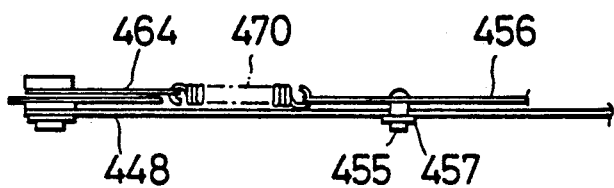
FIG. 25 is a cross section along the line 25—25 in FIG. 24.

FIG. 23 is a plan view of the fifth embodiment of the invention. In the figure reference numerals 401 to 418 and 411 to 446 designate identical or equivalent elements as in the prior art shown in FIGS. 27 to 31. FIG. 24 is a plan view for explaining a driving mechanism with tape loading blocks 407 and 408 picked up by eliminating chassis 401 from the device shown in FIG. 23. FIG. 25 is a cross section along the line 25—25 in FIG. 24.

In the figures a driving 447 is gear mounted rotatably on chassis 401. A fan-shaped rotating member 448 has gear portion 449 engaging with driving gear 447 and is mounted on chassis 401 rotatably on pivot 450. A slot 451 is formed on a plate portion 452 of rotating member 448 so that slot 451 is located on a circular of which a center is pivot 450. A pin 453 which is attached on chassis 401 and has a step; the smaller diameter portion thereof is inserted in slot 451. The step acts as a guide of rotating member 448 in the radial and vertical directions when rotating member 448 rotates on pivot 450. A cam groove 454 is formed in a shape of a letter S on plate portion 452 of rotating member 448 and engages pin 455. As shown in FIG. 25, one end of pin 455 is fixed on slider 456 and another passing through cam groove 454 is prevented from being separated from cam groove 454 by washer 457 fixed thereto. Slider 456 is mounted on chassis 401 so as to be slidable by engagement between slots 458, 459 and 460 formed on slider 456 and posts 461, 462 and 463 fixed on chassis 401, respectively. Thus when rotating member 448 rotates on pivot 450, slider 456 can slide linearly in the direction of arrow A by the engagement between cam groove 454 and pin 455. Sliders 464 and 465 which have racks 464a and 465a and are mounted on slider 456 so as to be slidable by engagements between slots 490 and 491 formed on sliders 464 and 465 and posts 466 and 467, and 468 and 469 attached on slider 456, respectively. Sliders 464 and 465 are pulled to the right in the drawing by springs 470 and 471 as elastic means interposed between slider 456 and sliders 464 and 465, so posts 466 and 468 are in contact with ends 490a and 491a of slots 490 and 491, respectively. Gears 472 and 473 engage with racks 464a and 465a and are supported rotatably on posts 462 and 463. driving arms 474 and 475 rotate on posts 462 and 463 together with gears 472 and 473, respectively. Thus when slider 465 moves to the right, driving arms 474 and 475 rotate in the counterclockwise and clockwise directions, respectively. One end of driving arms 474 and 475 are connected rotatably to arms 441 and 442 through pivots 443 and 444, and another end of arms 441 and 442 are connected rotatably to tape loading blocks 407 and 408 through pivots 445 and 446 respectively.

In the magnetic tape recording and playback device described above, at the time of loading, driving gear 447 is rotated in the clockwise direction by a motor (not shown), rotating member 448 rotate on pivot 450 in the counterclockwise direction, and slider 456 moves to the right because pin 455 fixed on slider 456 is guided by cam groove 454 formed on rotating member 448. At this time, sliders 464 and 465 move to the right together with slider 456 because spring 470 and 471 exert the forces exceeding loads which are generated at the time of tape-loading. By the engagement between racks 464a and 465a and gears 472 and 473, therefore, driving arms 474 and 475 rotate in the counterclockwise and clockwise directions, respectively, and tape loading blocks 407 and 408 move in the tape-loading direction along guide grooves 415 and 416. When tape loading blocks 407 and 408 engage with stoppers 413 and 414, respectively, sliders 464 and 465 stop. However, since slider 456 is driven further to the right, springs 470 and 471 generate forces for pressing tape loading blocks 407 and 408 to stoppers 413 and 414.

At the time of unloading, rotating member 448 is rotated in the clockwise direction and slider 456 slides to the left together with sliders 464 and 465. Therefore driving arms 474 and 475 rotate in the clockwise and counterclockwise directions, respectively, and tape loading blocks 407 and 408 move in the reverse directions. Thus the device reaches the unloading position.

Figure 26:
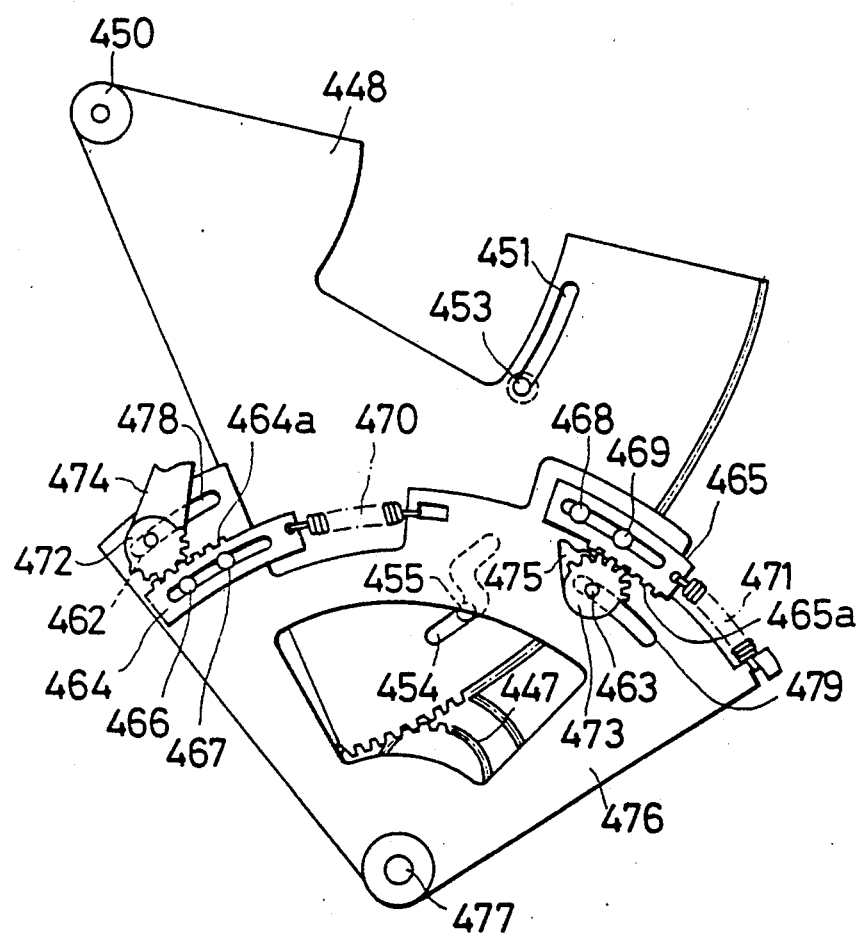
FIG. 26 is a plan view of the sixth embodiment of the invention.
Figure 27:
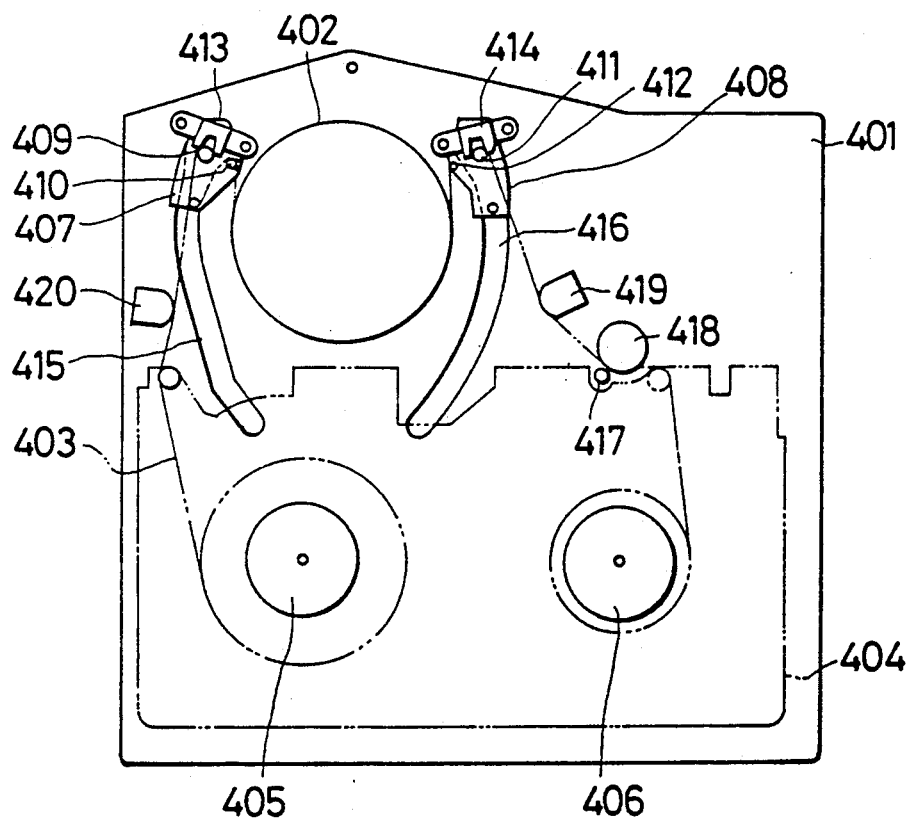
FIG. 27 is a plan view of the fifth conventional device in a state of loading.
Figure 28:
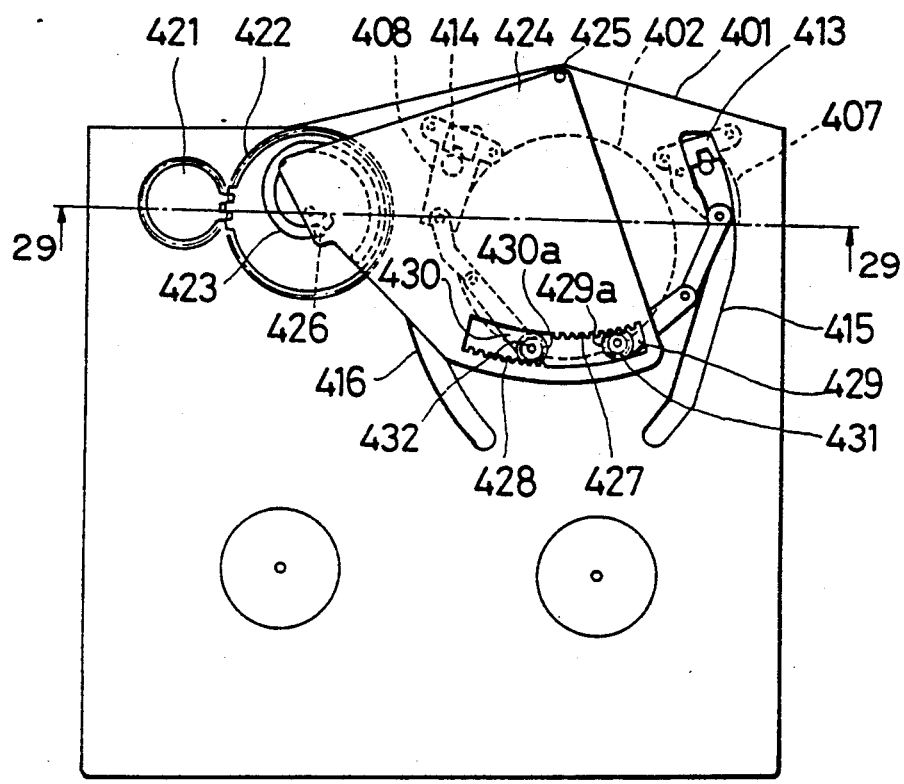
FIG. 28 is a bottom view of tape loading mechanism shown in FIG. 27.
Figure 29:
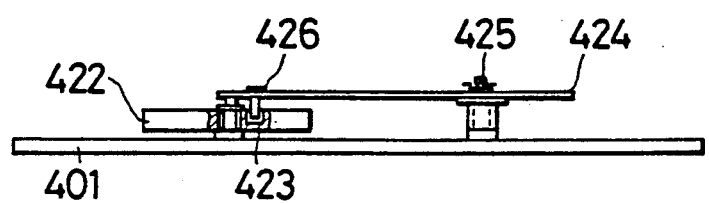
FIG. 29 is a cross section along the line 29—29 in FIG. 28.
Figure 30:
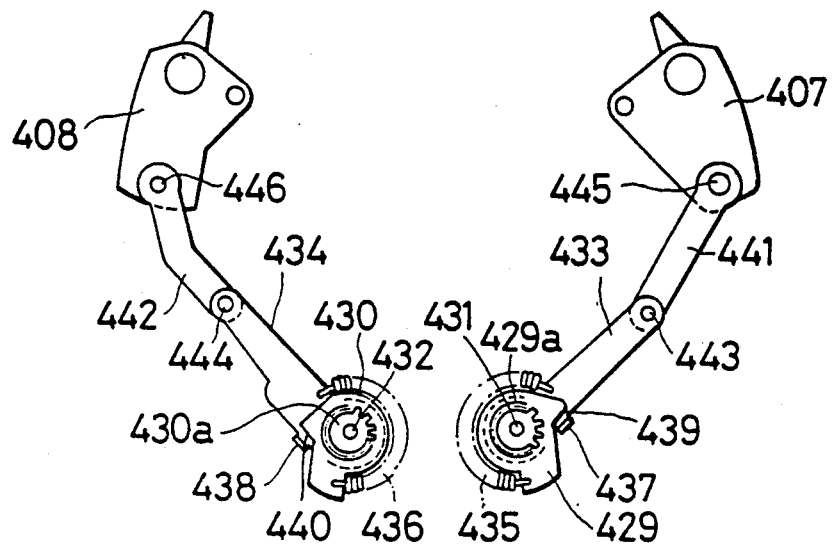
FIG. 30 is a drawing showing a structure of tape loading mechanism in the fifth conventional device in a state of loading.
Figure 31:
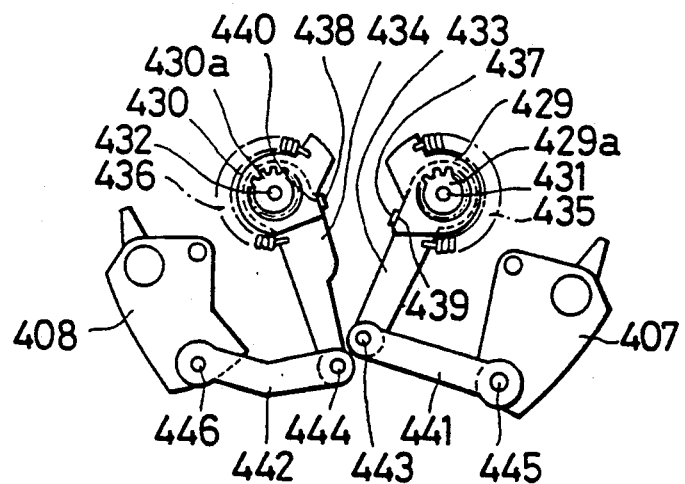
FIG. 31 is a drawing showing a structure of tape loading mechanism in the fifth conventional device in a state of unloading.

Although in the embodiment described above, slider 456 moving linearly to the left and right is shown, as shown in FIG. 26, a member rotating on a pivot can be employed instead of the slider. In this embodiment a slider 476 can rotate on pivot 477 attached on chassis 401, and includes slots 478 and 479 being located on circulars of which centers are pivot 477, and also has pin 455 engaging with cam groove 454. Furthermore, sliders 464 and 465, which have gear portions 464a and 465a engaging with gears 472 and 473, respectively, are mounted on slider 476 so that they can rotate on pivot 477. Springs 470 and 471 generate forces for pulling sliders 464 and 465 in the clockwise direction. It is apparent that in this embodiment when rotating member 448 rotates on pivot 450 in the counterclockwise and clockwise directions, slider 476 rotates on pivot 477 in the clockwise and counterclockwise directions, and the tape can be loaded and unloaded, respectively.

Figure 32:
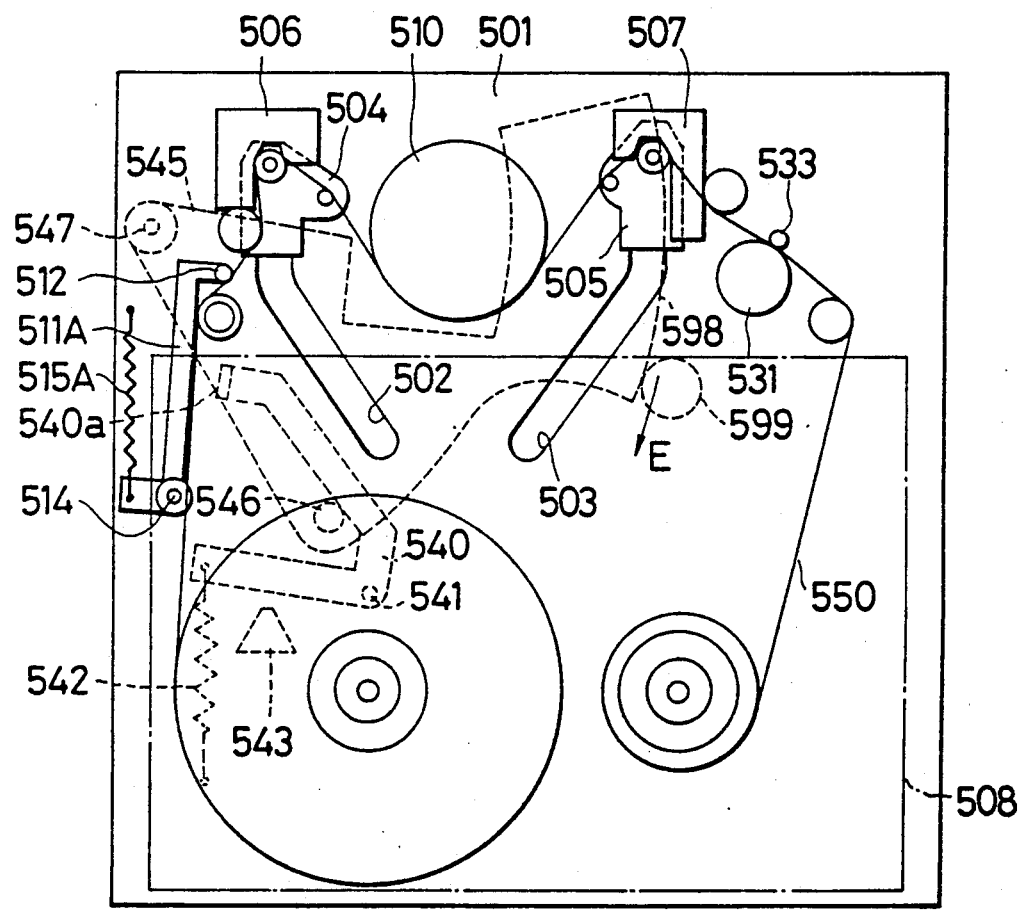
FIG. 32 is a plan view of the seventh embodiment of the invention in a state of loading.
Figure 34:
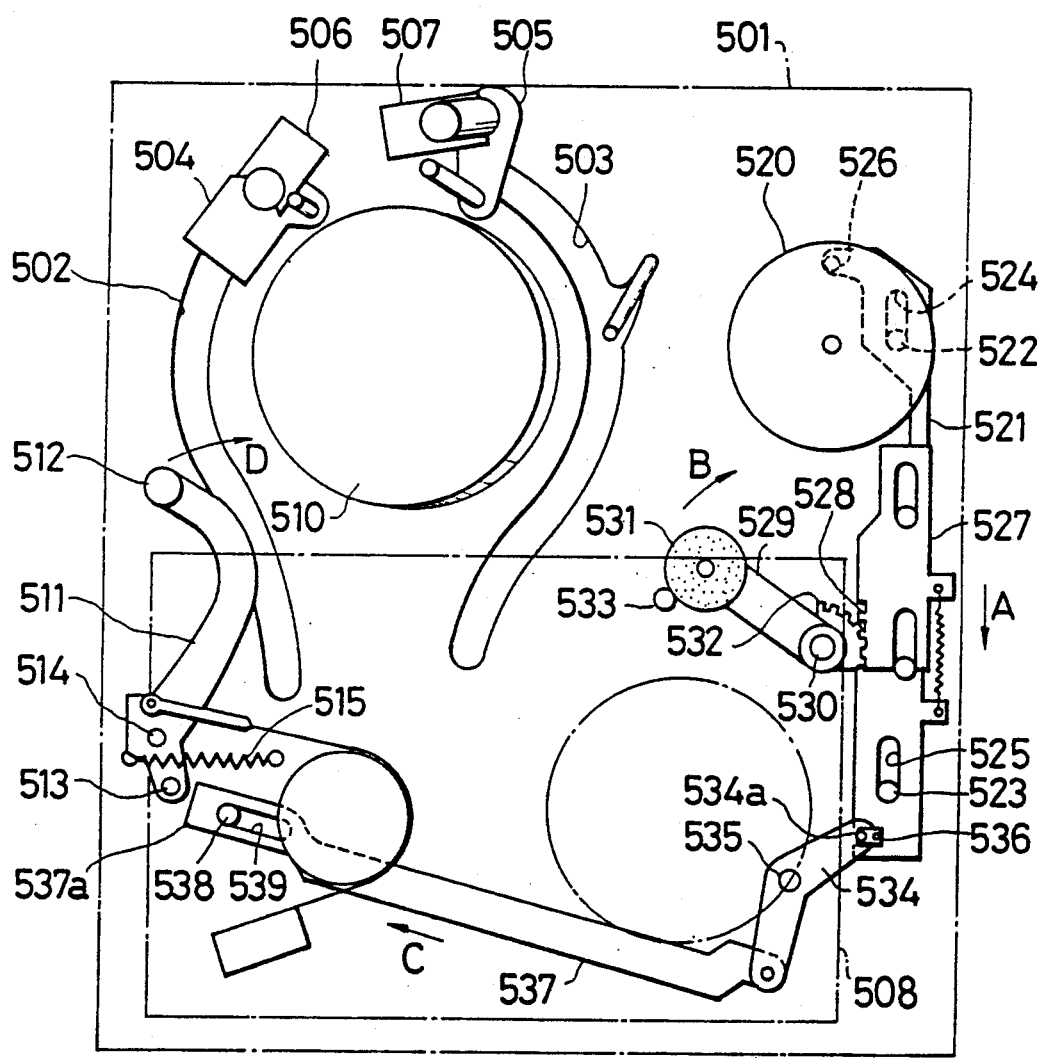
FIG. 34 is a plan view of the sixth conventional device in a state of loading.
Figure 35:
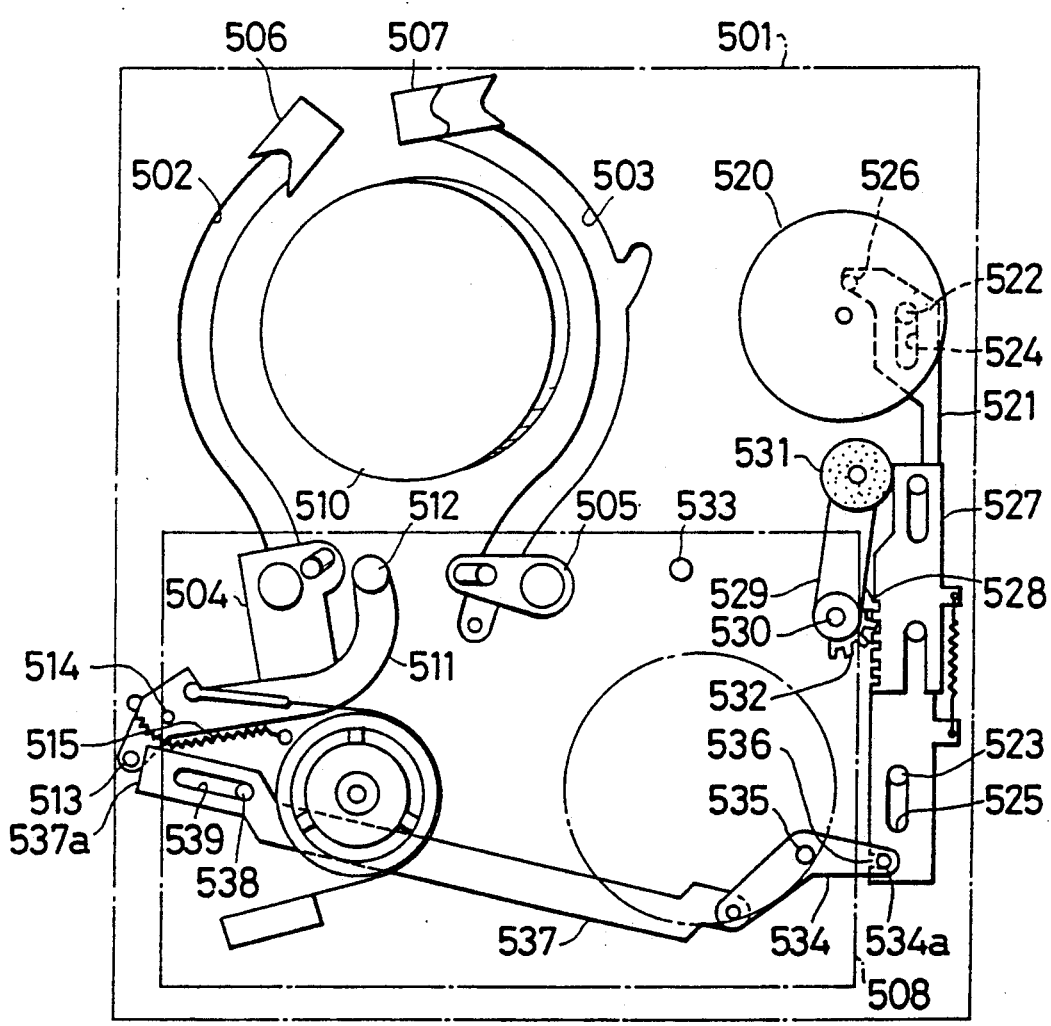
FIG. 35 is a plan view of the sixth conventional device in a state of unloading.

The seventh embodiment of the invention will be described below with reference to FIGS. 32 and 33 which are plan views showing a tension arm in states of loading and unloading, respectively. Identical or equivalent elements to those in said conventional device shown in FIGS. 34 and 35 are given identical numbers, and their descriptions are therefore omitted.

In the figures, a tension arm 511A is pulled in the clockwise direction by spring 515A interposed between one end of tension arm 511A and chassis 501. Transmission arm 540 supported rotatably on chassis 501 through pivot 541 is pulled in the counterclockwise direction by spring 542 interposed beween one end of tramsmission arm 540 and chassis 501. A stopper 543 is made of a part of the chassis 501 for stopping transmission arm 540. Fan-shaped rotating member 545 with pin 546 is supported rotatably on chassis 501 through pivot 547. A gear 599 which is driven by a motor not shown and engages with gear portion 598 formed on the periphery of rotating member 545.

Now the operation will be described below. In FIG. 32 which is a plan view showing a state of loading of magnetic tape and tension arm, magnetic tape 550 is located in a path where recording and playback can be done. At the time of unloading rotating member 545 is rotated in the direction of arrow E by a motor through gear 599 and gear portion 598. Accordingly, pin 546 fitted on rotating member 545 rotates in the direction of arrow E, and transmission arm 540 engaging with pin 546 rotates together with pin 546 in the counterclockwise direction because spring 542 pulls arm 540 in the direction. When end 540a of transmission arm 540 engages with the middle of tension arm 511A, tension arm 511A is rotated on pivot 514 in the counterclockwise direction in opposition to the force of spring 515A which is weaker than that of spring 542. Therefore, tension post 512 is separated from magnetic tape 550 and comes into the unloading state. Although rotating member 545 rotates further in the direction of arrow E, transmission arm 540 is kept in a specific position where it engages with stopper 543.

Figure 33:
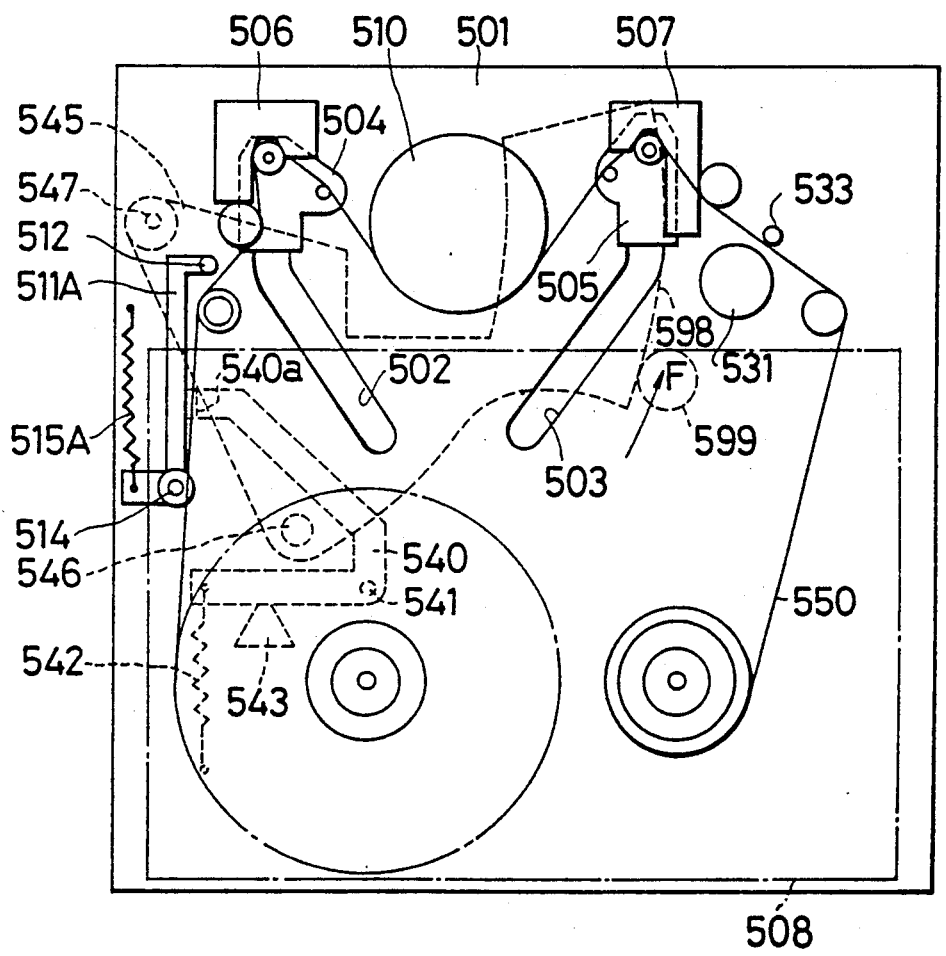
FIG. 33 is a plan view of the seventh embodiment of the invention in which a tension arm is in a state of unloading.

At the time of loading, a motor is rotated and rotating member 545 starts to rotate through gear 599 and gear portion 598 in the direction of arrow F in FIG. 33. When pin 546 fixed on rotating member 545 engages with the middle of transmission arm 540, transmission arm 540 rotates on pivot 541 attached on chassis 501 in the clockwise direction in opposition to the force of spring 542. Since pulled by spring 515A, tension arm 511A rotates on pivot 514 fitted on chassis 501 in the clockwise direction in accordance with the rotation of end 540a of transmission arm 540 in the clockwise direction. Therefore tension post 512 attached on tension arm 511A engages with magnetic tape 550. When end 540a is separated from tension arm 511A by further rotation of transmission arm 540 in the clockwise direction, tension arm 511A stops in the state where the tensions of spring 515A and magnetic tape 550 are balanced each other as shown in FIG. 32. Thus the tension of magnetic tape is controlled.

When the plane of rotating member 545 is wide, the degree of freedom to attach pin 546 on the plate is improved, so it can be located at the best position in order to load tension arm 511A efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic tape recording and playback device for recording signals on and playing back signals from a magnetic tape, comprising:
   a chassis;
   a rotating drum rotatably mounted to said chassis, said magnetic tape being selectively engaged with said rotating drum;
   a tape loading block, slidably mounted within guide grooves of said chassis for removing the magnetic tape from a tape cassette and winding it around said rotating drum;
   a rotating member pivotally mounted to and beneath a planar surface of said chassis, and including a fan-shaped plate having at least one guide groove formed therein;
   a linearly slidable moving member slidably hung beneath a lower planar surface of said chassis and including means for advancing and retracting said tape loading block; and
   a pin fixed to a lower surface of said moving member and in engagement with said at least one guide groove of said rotating member so that rotation of said rotating member in a loading direction causes said pin fixed to said moving member to follow said at least one guide groove of said rotating member thus sliding said moving member in a first linear direction enabling advancement of said tape loading block into a loading position in which the manetic tape is in contact with said rotating drum.

2. The device according to claim 1, further comprising:
   a capstan;
   a pinch arm;
   a pinch roller mounted on said pinch arm and which is pressed against the capstan to pinch the magnetic tape between the pinch roller and the capstan to move the magnetic tape;
   said moving member further including a pressure member pivoted at one part thereof on the rotating member; and
   a pin fixed to another part of the pressure member;
   said pinch arm having a guide groove;
   said pin fixed to said another part of the pressure member;
   said pinch arm having a guide groove;
   said pin fixed to said another part of said pressure member and being slidably engaged with said guide groove so that as said rotating member rotates in said one direction, said pressure member is pivoted on said rotating member and said pin fixed on said pressure member moves, and by engagement between said pin said guide groove of said pinch arm, said pinch arm rotates to move said pinch roller toward said capstan.

3. The device according to claim 1, further comprising:
   a tension arm;
   a tension post which fixed to said tension arm and which controls the tension on the magnetic tape;
   a pin fixed to said tension arm; and
   a spring which gives biasing force to the tension arm in one direction;
   said rotating member having a pressure portion which is in pressure contact with said pin overcoming the biasing force from said spring when the device is in a first state, and is pulled away from said pin when the device is brought to loading condition and said rotating member rotates in said one dirction, so that said tension post is brought to a position in which it applies tension to the magnetic tape.

4. The device according to claim 1, wherein rotation of sai rotating member in an unloading direction causes said pin fixed to said moving member to follow said at least one guide groove of said rotating member thus sliding said moving member in a second linear direction enabling retraction of said tape loading block into an unloading position in which the magnetic tape is out of contact with said rotating drum.

5. The device according to claim 1, wherein said means for advancing and retracting said tape loading block includes link arms pivotably connected at first ends therof to said tape loading block and at second ends thereof to said moving member by a rack and gear arrangement, whereby sliding movement of said moving member in a first linear direction advances said link arms and said loading block in a loading direction and sliding movement of said moving member in a second linear direction retracts said link arms and said loading block in an unloading direction.

* * * * *